US012809811B2

(12) United States Patent
Bavishi et al.

(10) Patent No.: US 12,809,811 B2
(45) Date of Patent: Nov. 24, 2026

(54) MEDIA CHIPLET FOR CONTROLING DATA FLOW TO MEMORY SYSTEM THAT SUPPORTS DETERMINISTIC AND NON-DETERMINISTIC MEMORY INPUT/OUTPUT

(71) Applicant: Micron Technology, Inc., Boise, ID (US)

(72) Inventors: Dhawal Bavishi, San Jose, CA (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 84 days.

(21) Appl. No.: 19/054,430

(22) Filed: Feb. 14, 2025

(65) Prior Publication Data

US 2025/0265219 A1 Aug. 21, 2025

Related U.S. Application Data

(60) Provisional application No. 63/553,813, filed on Feb. 15, 2024.

(51) Int. Cl.
*G06F 13/00* (2006.01)
*G06F 13/42* (2006.01)

(52) U.S. Cl.
CPC ................................ *G06F 13/4291* (2013.01)

(58) Field of Classification Search
CPC ............................ G06F 13/4291; G06F 13/00
See application file for complete search history.

(56) References Cited

U.S. PATENT DOCUMENTS

2021/0374056 A1* 12/2021 Malladi ............. G06F 15/17331
2023/0094111 A1* 3/2023 Benisty ................... G06F 3/061 711/103
2023/0116614 A1* 4/2023 Shi .......................... H04L 45/50 370/252
2023/0236742 A1* 7/2023 Sehgal ................. G06F 3/0679 711/154

* cited by examiner

*Primary Examiner* — Tammara R Peyton
(74) *Attorney, Agent, or Firm* — Schwegman Lundberg & Woessner, P.A.

(57) ABSTRACT

A variety of applications can include memory or memory sub-systems having a memory-centric protocol with dedicated unidirectional serialized interfaces in the two directions of the interface for the memory or the memory sub-systems. The unidirectional serialized interfaces can be realized by dedicated pins on the devices connected by the devices. The memory-centric protocol with dedicated unidirectional serialized interfaces can support both deterministic and non-deterministic timed input/output to media and memory sub-systems.

20 Claims, 9 Drawing Sheets

MEDIA CHIPLET FOR CONTROLING DATA FLOW TO MEMORY SYSTEM THAT SUPPORTS DETERMINISTIC AND NON-DETERMINISTIC MEMORY INPUT/OUTPUT

PRIORITY APPLICATION

This application claims the benefit of priority to U.S. Provisional Application Ser. No. 63/553,813, filed Feb. 15, 2024, which is incorporated herein by reference in its entirety.

FIELD OF THE DISCLOSURE

Embodiments of the disclosure relate generally to integrated circuits, and more specifically, to input/output support for memory devices.

BACKGROUND

Memory devices are typically provided as internal, semiconductor, integrated circuits in computers or other electronic devices. There are many different types of memory, including volatile and non-volatile memory. Volatile memory requires power to maintain its data, and includes random-access memory (RAM), dynamic random-access memory (DRAM), static RAM (SRAM), or synchronous dynamic random-access memory (SDRAM), among others. Non-volatile memory can retain stored data when not powered and includes flash memory, read-only memory (ROM), electrically erasable programmable ROM (EEPROM), erasable programmable ROM (EPROM), resistance-variable memory, such as phase-change random-access memory (PCRAM), resistive random-access memory (RRAM), magnetoresistive random-access memory (MRAM), or three-dimensional (3D) XPoint™ memory, among others.

Implementation of a memory system can take a number of formats. A memory system can be realized by one or more memory chiplets. A chiplet is a small modular chip that can be combined with other chiplets to form a larger system that can be more complex than a single chiplet. A chiplet is an integrated circuit (IC) that can contain a well-defined subset of functionality for the more complex system of combined chiplets. A chiplet can be structured with other chiplets on an interposer in a single package and can be structured having one type of memory or more than one type of memory. Operational properties of memory systems and other electronic devices can be improved by enhancements to the design of data flow between processing devices and memory systems including between a host processor or memory controller and memory chiplets. A "media chiplet" is an IC that contains a well-defined subset of functionality for storing and retrieving information. Chiplets of different types can be assembled and integrated into a common package to create a sub-system or system. Chips, on the other hand, are generally individually packaged into its own package and then assembled together on a printed circuit board to create a sub-system or system.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
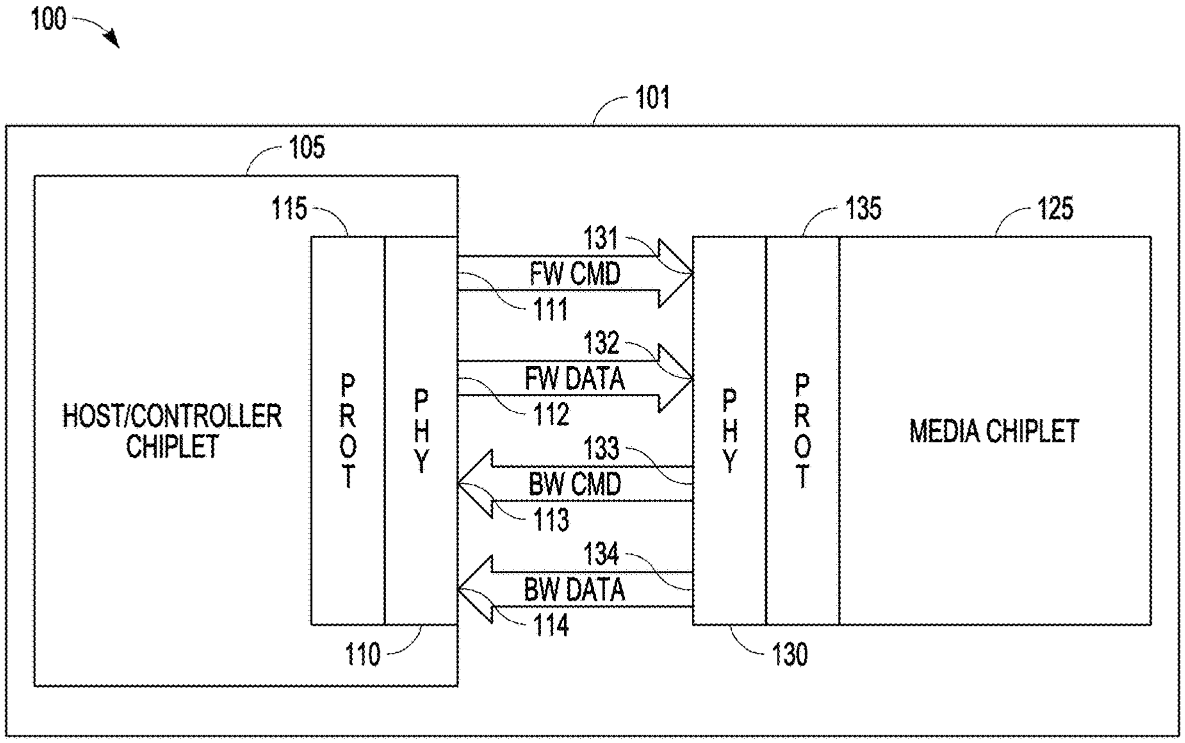
FIG. 1 illustrates an arrangement of a host/controller chiplet interfacing a media chiplet in a point-to-point configuration that can support deterministic timed input/output and non-deterministic timed input/output, in accordance with various embodiments.

The following detailed description refers to the accompanying drawings that show, by way of illustration, various embodiments that can be implemented. These embodiments are described in sufficient detail to enable those of ordinary skill in the art to practice these and other embodiments. Other embodiments can be utilized, and structural, logical, mechanical, and electrical changes can be made to these embodiments. The various embodiments are not necessarily mutually exclusive, as some embodiments can be combined with one or more other embodiments to form new embodiments. The following detailed description is, therefore, not to be taken in a limiting sense.

Universal Chiplet Interconnect Express™ (UCIe™), referred to herein as UCIe, is an open specification for a die-to-die interconnect and serial bus between chiplets, allowing for interoperable, multi-vendor operation. Current proposals for unidirectional serial interface for memory chiplets based on UCIe only support deterministic timing for commands (cmds) and data, which are aligned to the memory array. Deterministic timing of input and output for a memory medium or memory media means that substantially only known and expected amounts of time occur for execution of a given operation from an appropriate command between a host processing component or memory controller processing component (host processing component/memory controller processing component) and a memory device or memory system. A host processing component/memory controller processing component can be implemented by a host/controller chiplet. An example of deterministic timing can include, but is not limited to, core timings with a chiplet interface for a low power double data rate generation five memory (LPDDR5) with deterministic times for row-to-row delay (tRRD), row address to column address delay (tRCD), read latency (RL), write latency (RL/WL), and similar times of memory operations. Such deterministic timing allows only for point-to-point connections between a host/controller chiplet and a memory die. Thus, aspects such as system capacity expansion and modularity of a memory sub-system can only be accounted for by the host/controller chiplet which would operate to replicate this interface multiple times to scale the system capacity and add reliability, availability, and serviceability (RAS) features. These characteristics make the system constrained and difficult to modularize by a memory vendor. Memory vendors have typically used dual in-line memory module (DIMM) style form-factors to address endurance aspects of media and allow for replacement of memory systems in-the-field, since lifetimes of media dies are shorter than host dies.

In the UCIe specification, the following protocol mappings are used on top of UCIe lower level (LL) and physical layer (PHY): PCIe 6.0 FLIT mode, compute express link (CXL) 2.0, CXL 68B-Ehanced FLIT Mode, CXL 256B FLIT mode for CXL 2.0, and streaming protocol. In FLIT mode, packets are structured in flow control units of fixed sizes rather than variable sizes. If CXL is negotiated, each of CXL.io, CXL.cache, and CXL.mem protocols are negotiated independently. For streaming protocols, generic modes are offered for a user defined protocol to be transmitted using UCIe.

A UCIe chiplet interface in a point-to-point arrangement between a host/controller chiplet and a media chiplet has been proposed that includes a deterministic timed input or output (I/O). The pin mapping for this interface provides for pin mapping for parity with fifth generation low power (LP5) memory, high bandwidth memory (HBM), and other devices. This current UCIe chiplet interface proposal supports unidirectional forward (fw) path+pins for forward data (host/controller chiplet to media chiplet) and forward command (host/controller chiplet to media chiplet) as a serial interface. Forward is a direction from a processing device, such as a host/controller or module control, to a memory device or media device. Backward is a direction from the memory device or media device to the processing device. This current proposal also supports unidirectional backward (bw) path+pins for backward data (media chiplet to host/controller chiplet) as a serial interface. Deterministic timed I/O is used to maintain memory array timing. A pin of a circuit or circuit interface is a physical structure adapted to make electrical connection with another circuit or electrical interface. A pin can be realized in a number of different electrically conductive formats.

However, in the point-to-point arrangement between a host/controller chiplet and a media chiplet in this current UCIe chiplet interface proposal, the host/controller chiplet and the media chiplet are located in the same package for high gigatransfers per second (GT/s). This arrangement can also result in memory capacity reduction in the point-to-point arrangement. Mapping LP5, HBM, and stacked DRAM (TCDRAM) protocols, along with other memory protocols, onto UCIe PHY with commands and timings can be implemented as user-defined streaming or raw protocols transmitted over UCIe.

A UCIe chiplet interface for a host/controller chiplet to multiple media chiplets has been proposed that includes multiple point-to-point arrangements in a single package and deterministic timed I/O. Each media chiplet is interfaced with the host/controller chiplet in an individual point-to-point arrangement. Multiple channels, one for which media chiplet, are configured on the host/controller chip for capacity. Each channel is structured with path+pins for point-to-point unidirectional forward command, point-to-point unidirectional forward data, and point-to-point unidirectional backward data. The host/controller chiplet configures and supports interleaving or lock-step arrangement across channels. Deterministic timed I/O is used to maintain memory array timing. However, in the point-to-point arrangement between a host/controller chiplet and multiple media chiplets in this current UCIe chiplet interface proposal, RAS is developed at and by the host chiplet. Sub-systems defined by the multiple media chiplets are potentially not modular since the media chiplets are integrated with a host inside a single package.

A packetized option can be implemented on a UCIe interface, such as CXL as proposed in the UCIe specification. CXL is an open standard interconnect configured for high-bandwidth, low-latency connectivity between host devices and other devices such as accelerators, memory buffers, and other I/O devices. CXL was designed to facilitate high-performance computational workloads by supporting heterogeneous processing and memory systems. CXL enables coherency and memory semantics on top of peripheral component interconnect express (PCIe)-based I/O semantics for optimized performance.

CXL can be used in applications such as artificial intelligence, machine learning, analytics, cloud infrastructure, edge computing devices, communication systems, and elsewhere. Data processing in such applications can use various scalar, vector, matrix, and spatial architectures that can be deployed in a central processing unit (CPU), a graphics processing unit (GPU), a field-programmable gate array (FPGA), a digital signal processors (DSP), an application-specific integrated circuit (ASIC), other programmable logic devices, smart network interface cards (NICs), or other accelerators that can be coupled using a CXL link. A processing module, such as a CPU, can be realized as a host device or host processor in the architecture in which the CPU is structured.

CXL supports dynamic multiplexing using a set of protocols that includes CXL.io, based on PCIe, for I/O, CXL.cache for caching, and CXL.memory for memory semantics. CXL can be used to maintain a unified, coherent memory space between the CPU and any memory on the attached CXL device. This configuration allows the CPU and the CXL device to share resources and operate on the same memory region for higher performance, reduced data movement, and reduced software stack complexity. In an example, the CPU can be primarily responsible for maintaining or managing coherency in a CXL environment. Accordingly, CXL can be leveraged to help reduce device cost and complexity, as well as overhead traditionally associated with coherency across an I/O link.

CXL technology can maintain memory coherency between the CPU memory space and memory on attached devices, which enables resource sharing for higher performance, reduces software stack complexity, and lowers overall system cost. Three primary types of devices can employ a CXL interconnect protocol. Type 1 devices can include accelerators such as smart NICs that typically lack local memory. Via CXL, these type 1 devices can communicate with memory of the host processor to which it is coupled. Type 1 devices can use CXL.io+CXL.cache protocols. Type 2 devices can include GPUs, ASICs, and FPGAs that are equipped with instrumentalities such as, but not limited to, double data rate (DDR) memory or HBM and can use CXL to make the memory of the host processor locally available to an accelerator and make the memory of the accelerator locally available to the host processor. The type 2 devices can also be co-located in the same cache-coherent domain and help boost heterogeneous workloads. Type 2 devices can use CXL.io+CXL.cache+CXL.memory protocols. Type 3 devices can include memory devices that can be attached via CXL to provide additional bandwidth and capacity to host processors. The type of memory is independent of the main memory of the host. Type 3 devices can use CXL.io+ CXL.memory protocols.

To implement a packetized option, such as CXL, on a UCIe interface, the associated memory die or intermediary ASIC chip would use a significant amount of logic area, increase latency, and use power to decode the packet and separate the command, address, and data. This approach may not be feasible for memory dies from a cost, a latency, and a power perspective, as memory dies are sensitive to these factors as are memory vendors. In practice, implementation of ASIC dies (chips) are at higher cost, latency, and power and default is made to the above mentioned UCIe-based serial interface proposals for memory chiplets to create scalable systems. Since all of commands and data travel on the same pins, the net user bandwidth as observed in CXL-based systems is lower than prescribed by the interface specifications because a significant amount of the bandwidth is taken up by the commands, addresses, and transaction IDs associated with non-deterministic timing.

Persistent non-volatile dual in-line memory module (NVDIMM-P) protocol allows for non-deterministic timed commands between a host and memory sub-system, but the data I/O at a pin-level is strictly bi-directional, and thus implementation uses write-to-read and read-to-write turn-around management, and does not have dedicated paths of forward going data, which includes write operations, and backward going data, which includes read operations. This structural architecture limits the system bandwidth achievable using this protocol.

In various embodiments, the disadvantages of each of these existing interface proposals can be addressed in a manner to allow for addressing deterministic and non-deterministic I/O for memory systems. Addressing deterministic and non-deterministic timing can be performed while maintaining pin-count parity and keeping system operation and design simpler at a lower cost and a lower power.

In various embodiments, a protocol can be implemented for building scalable sub-systems of media-agnostic memory via the convergence of existing standards or proposals. Unidirectional forward command path and pins (path+pins) and unidirectional forward data path+pins along with a unidirectional backward (backward) command path+ pins to transmit meta-data or transaction identifications (IDs) and unidirectional backward data path+pins can be implemented to interface a host/controller with a memory system of one or more memory media chiplets. A forward command path is a path along which a command is transmitted from a processing device, such as a host/controller or module control, to a memory device or media device. A forward data path is a path along which data is transmitted from a processing device, such as a host/controller or module control, to a memory device or media device. A backward command path is a path along which information is transmitted from the memory device or media device to the processing device, where the information is related to a command received at the memory device or media device. A backward data path is a path along which data is transmitted from the memory device or media device to the processing device. Forward command path+pins can be described by the unidirectional serial interface proposals for memory chiplets to support commands as well as transaction/request identification (ID) with a unidirectional path+ pins for data. This structural arrangement can allow for attaining the best advantages among UCIe, CXL, and NVDIMM-P and can address deficiencies of each of UCIe, CXL, and NVDIMM-P.

This arrangement of forward path+pins and backward path+pins can provide a mechanism to support both deterministic and optionally non-deterministic timings at the interface level with dedicated unidirectional paths for forward going commands, forward going data, backward going data, and command/ID. This arrangement allows a memory vendor to build systems with scalable capacity, modularity, and capability to allow for multi-die RAS considerations, which cannot be otherwise supported at a lower cost and power. This arrangement can be implemented with a protocol for building scalable media-agnostic memory sub-systems via the convergence of existing standards/proposals. Scalable media-agnostic memory sub-systems can include a number of different memory media chiplets of diverse types of media.

Structural arrangements of forward command path+pins and forward data path+pins along with a backward command path+pins and backward data path+pins allows a memory vendor to produce DIMM or other form-factor style media systems that are modular, while still supporting a point-to-point chiplet deterministic interface. For example, a point-to-point chiplet deterministic interface internal to a package for a single media chiplet connected to a host/ controller chiplet can be supported. Such arrangements can support both deterministic and non-deterministic timings on the interface. Deterministic timing uses forward command pins to send command, and the forward and backward data pins to send and receive write data and read data, respectively. The timings between command issuance and operations are fixed. In this deterministic timing mode, the backward data path+pins are not used.

In the non-deterministic timing mode, forward command pins can be used, and a protocol can provide support for request ID to be transmitted with the command, as possibly an extra pin or more cycles on existing pins. In this non-deterministic timing mode, the backward command pins can be used to receive information such as request ID and can operate in a non-deterministic way to execute an internal operation or be transmitted back with read data on the read data pins of the backward unidirectional channel. Though non-deterministic timing of input and output are not directed to fixed amounts of time, a time limit can be used for reception of a response to a command generated between a host processing component/memory controller processing component and a memory device or memory system.

Structural arrangements of forward command path+pins and forward data path+pins along with a backward command path+pins and backward data path+pins can allow for an ASIC logic die, such as a ASIC logic chiplet, coupled to sub-systems of media chiplets, to receive commands or data from one or more hosts/controllers and forward the commands via replication to the media dies, without a typical ASIC that uses physical area, generated latency, or power in decoding packets. Such an ASIC logic die can be structured to also perform internal operations as specified in the received command or perform operations between the media dies on the media sub-systems and return an ID back to the one or more hosts/controllers via the backward command path+pins after completing the operation in non-deterministic time.

Structural arrangements of forward command path+pins and forward data path+pins along with a backward command path+pins and backward data path+pins can support multiple media types on the same system or module for future-looking media sub-systems. This support can be provided with one or more protocol layers (PROTs) coupled with corresponding PHYs on an ASIC logic chiplet for the structural arrangements. Structural arrangements of forward command path+pins and forward data path+pins along with a backward command path+pins and backward data path+pins can provide support for three-dimensional (3D) stacked media subsystems, where the media subsystems of a stack are structured to operate having non-deterministic timings.

FIG. 1 illustrates an arrangement 100 of a host/controller chiplet 105 interfacing a media chiplet 125 in a point-to-point configuration that can support deterministic timed I/O and non-deterministic timed I/O. Arrangement 100 can be realized in a single package 101. Host/controller chiplet 105 is an example of a processor to control data flow to a memory system, where the media chiplet 125 can be the memory system or included in the memory system. Host/controller chiplet 105 can include an interface having dedicated pins 111, 112, 113, and 114 at PHY 110. Media chiplet 125 can include an interface having dedicated pins 131, 132, 133, and 134 at PHY 130. Each of dedicated pins 111, dedicated pins 112, dedicated pins 113, dedicated pins 114, dedicated pins 131, dedicated pins 132, dedicated pins 133, and dedicated pins 134 can be a set of one or more pins. Dedicated pins 111 can be a portion of a dedicated forward command path to provide a first unidirectional forward path to transmit commands to media chiplet 125 to be received at dedicated pins 131. Dedicated pins 112 can be a portion of a dedicated forward data path to provide a second unidirectional forward path to transmit data to media chiplet 125 to be received at dedicated pins 132. Dedicated pins 113 can be a portion of a dedicated backward command path to provide a first unidirectional backward path to receive command details received from dedicated pins 133. The command details can be information generated in response to a transmitted command to media chiplet 125 on the first unidirectional forward path. Dedicated pins 114 of a dedicated backward data path to provide a second unidirectional backward path to receive stored data from media chiplet 125. A PROT 115 coupled to PHY 110 can be arranged to control the interface with media chiplet 125 using a selected deterministic or a non-deterministic I/O timing associated with media chiplet 125. A PROT 135 coupled to PHY 130 can be arranged to control the interface with host/controller chiplet 105 based on deterministic I/O timing characteristics or non-deterministic I/O timing characteristics of media chiplet 125.

A chiplet interface has been extended to media chiplet 125. Dedicated backward path+pins for command have been added, which can return transaction ID or metadata from media chiplet 125 to host/controller chiplet 105. Arrangement 100 can support both deterministic timed I/O and non-deterministic timed I/O. For example, such support can be used for stacked media. In the point-to-point arrangement 100, RAS can be developed by host/controller chiplet 105. With media chiplet 125 integrated on package 101 with host/controller chiplet 105, sub-systems of media chiplets are potentially not modular. However, the dedicated pins of the interfaces of arrangement 100 can be extended in implementations to build out scalable memory systems, where the scalable memory systems allow for addition of sub-systems of media chiplets. The sub-systems of media chiplets can be of different types of memory devices. Arrangement 100 allows for on-package UCIe and off-package serial interfaces.

Though one media chiplet is shown, arrangement 100 can have more than one media chiplet. Additional media chiplets can be structured in the same manner as media chiplet 125 with additional corresponding interfaces of a PROT on top a PHY within host/controller chiplet 105. Alternatively, package 101 can have multiple host/controller chiplets and multiple media chiplets arranged in pairs in the same manner as host/controller chiplet 105 and media chiplet 125.

Figure 2:
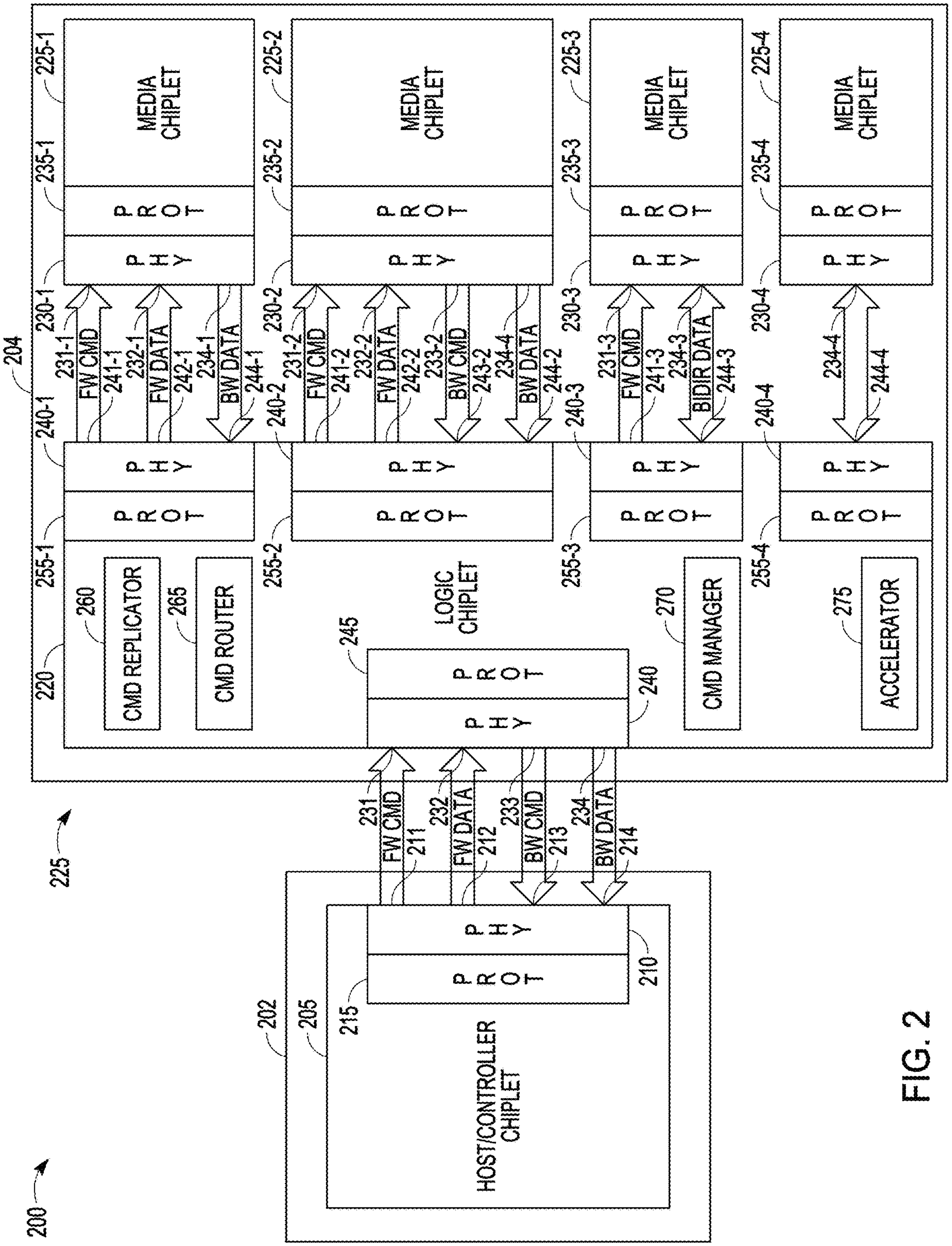
FIG. 2 illustrates an arrangement of a host/controller chiplet interfacing a memory system having a set of media chiplets that provides a mechanism for building a scalable memory system of memory sub-systems, in accordance with various embodiments.

FIG. 2 illustrates an arrangement 200 of a host/controller chiplet 205 interfacing a memory system 225 having a set of media chiplets 225-1, 225-2, 225-3, and 225-4 that provides a mechanism for building a scalable memory system of memory sub-systems. Host/controller chiplet 205 is an example of a processor coupled to memory system 225 to control data flow to memory system 225. Though four media chiplets are shown, arrangement 200 can have more or fewer media chiplets. Host/controller chiplet 205 can be configured on a package 202 and memory system 225 having media chiplets 225-1, 225-2, 225-3, and 225-4 can be configured on package 204. Package 202 can be different from package 204. Arrangement 200 can provide a protocol and interface to a memory system of memory sub-systems over a serial I/O PHY.

Host/controller chiplet 205 can include an interface having dedicated pins 211, 212, 213, and 214 at a PHY 210. Each of dedicated pins 211, dedicated pins 212, dedicated pins 213, and dedicated pins 214 can be a set of one or more pins. Dedicated pins 211 can be a portion of a dedicated forward command path to provide a first unidirectional forward path to transmit commands to memory system 225. Dedicated pins 212 can be a portion of a dedicated forward data path to provide a second unidirectional forward path to transmit data to memory system 225. Dedicated pins 213 can be a portion of a dedicated backward command path to provide a first unidirectional backward path to receive command details received from memory system 225. The command details can be information generated in response to a transmitted command to memory system 225 on the first unidirectional forward path. Dedicated pins 214 of a dedicated backward data path can be implemented to provide a second unidirectional backward path to receive stored data from memory system 225. A PROT 215 coupled to PHY 210 can be arranged to control the interface with memory system 225 using a selected deterministic or a non-deterministic I/O timing associated with memory system 225.

Memory system 225 can include a logic chiplet 220 having multiple channels coupled to media chiplets 225-1, 225-2, 225-3, and 225-4. Logic chiplet 220 can have an interface having dedicated pins 231, 232, 233, and 234 to couple to dedicated pins 211, 212, 213, and 214 of an interface of host/controller chiplet 205 at PHY 240. Each of dedicated pins 231, dedicated pins 232, dedicated pins 233, and dedicated pins 234 can be a set of one or more pins. Dedicated pins 231 of a dedicated unidirectional forward command path can be structured to receive commands from host/controller chiplet 205. Dedicated pins 232 of a dedicated unidirectional forward data path can be structured to receive data from host/controller chiplet 205, where the data can be for storage on memory system 225. Dedicated pins 233 of a dedicated unidirectional backward command path can be structured to transmit command details to host/controller chiplet 205. The command details can be information generated in response to a transmitted command to memory system 225 on the dedicated unidirectional forward command path. Dedicated pins 234 of a dedicated unidirectional backward data path can be structured to transmit stored data to host/controller chiplet 205. Logic chiplet 220 can include a PROT 245 coupled to PHY 240 to control interface with host/controller chiplet 205 based on a selected deterministic or non-deterministic I/O timing characteristics. Logic chiplet 220 can be a logic device realized by an application specific integrated circuit logic chiplet.

In the example arrangement 200, memory system 225 can include four different types of memory sub-systems, where each media chiplet has an interface structure different from the other media chiplets of memory system 225. Memory media chiplet 225-1 can include a PROT 235-1 on top of PHY 230-1. An interface coupled to PHY 230-1 can include media pins 231-1, 232-1, and 234-1 to couple to pins 241-1, 242-1, and 244-1 of an interface to a PHY 240-1 of logic chiplet 220. Each of media pins 231-1, media pins 232-1, media pins 234-1, pins 241-1, 242-1, and 244-1 can be a set of one or more pins. Media dedicated pins 231-1 of a unidirectional forward command path from logic chiplet 220 can be structured to receive commands from logic chiplet 220. Media pins 232-1 of a unidirectional forward data path from logic chiplet 220 can be structured to receive data from logic chiplet 220. The data can be directed for storage on media chiplet 225-1. Media pins 234-1 of a unidirectional backward data path can be structured to transmit stored data from media chiplet 225-1 to logic chiplet 220. A PROT 255-1 of logic chiplet 220 can be arranged on PHY 240-1 to control data to memory media chiplet 225-1 based on deterministic or non-deterministic I/O timing characteristics of media chiplet 225-1.

Memory media chiplet 225-2 can include a PROT 235-2 on top of PHY 230-2. An interface coupled to PHY 230-2 can include media pins 231-2, 232-2, 233-2, and 234-2 to couple to pins 241-2, 242-2, 243-3, and 244-4 of an interface to a PHY 240-2 of logic chiplet 220. Each of media pins 231-2, media pins 232-2, media pins 233-2, media pins 234-2, pins 241-2, 242-2, 243-2, and 244-2 can be a set of one or more pins. Media pins 231-2 of a unidirectional forward command path from logic chiplet 220 can be structured to receive commands from logic chiplet 220. Media pins 232-1 of a unidirectional forward data path from logic chiplet 220 can be structured to receive data from logic chiplet 220. The data can be directed for storage on media chiplet 225-2. Media pins 233-2 of a unidirectional backward command path can be structured to transmit stored data from media chiplet 225-2 to logic chiplet 220. The unidirectional backward command path can transmit meta-data or transaction IDs. Media pins 234-2 of a unidirectional backward data path can be structured to transmit stored data from media chiplet 225-2 to logic chiplet 220. A PROT 255-2 of logic chiplet 220 can be arranged on PHY 240-2 to control data to memory media chiplet 225-2 based on deterministic or non-deterministic I/O timing characteristics of media chiplet 225-2.

Memory media chiplet 225-3 can include a PROT 235-3 on top of PHY 230-3. An interface coupled to PHY 230-3 can include media pins 231-3 and 234-3 to couple to pins 241-3 and 244-3, respectively, of an interface to a PHY 240-3 of logic chiplet 220. Each of media pins 231-3, media pins 234-3, pins 241-3, and 244-3 can be a set of one or more pins. Media pins 231-3 of a unidirectional forward command path from logic chiplet 220 can be structured to receive commands from logic chiplet 220. Media pins 234-3 of a bidirectional data path can be structured to receive data from logic chiplet 220 to store in media chiplet 225-3 and to transmit stored data from media chiplet 225-3 to logic chiplet 220. A PROT 255-3 of logic chiplet 220 can be arranged on PHY 240-3 to control data to memory media chiplet 225-3 based on deterministic I/O timing.

Memory media chiplet 225-4 can include a PROT 235-4 on top of PHY 230-4. An interface coupled to PHY 230-4 can include media pins 234-4 to couple to pins 244-4 of an interface to a PHY 240-4 of logic chiplet 220. Each of media pins 234-4 and pins 244-4 can be a set of one or more pins. Media dedicated pins 234-4 of a hybrid path can be structured to transfer commands and data between logic chiplet 220 and memory media chiplet 225-4 to store and retrieve data using logic chiplet 220. A PROT 255-4 of logic chiplet 220 can be arranged on PHY 240-4 to control data flow with respect to memory media chiplet 225-2 based on deterministic I/O timing, non-deterministic I/O timing, or a hybrid of deterministic I/O timing and non-deterministic I/O timing.

Memory media chiplets 225-1, 225-2, 225-3, and 225-4 can be different types of memory operating under different I/O timing, while the interface to host/controller chiplet 205 can maintain a fixed protocol. This approach can allow for additions of memory media chiplets to memory system 225, which can be limited by the number of interfaces and channels of logic chiplet 220. Logic chiplet 220 can control flow of data among the memory media chiplets of memory system 225 using different protocols on different implementations of PHY. Each PHY of the different types of memory can have the same arrangement of dedicated pins, but one or more of the pins can be left unallocated according to its corresponding PROT.

Logic chiplet 220 can include a command router 265 to interleave storage operations across channels coupling the multiple memory media chiplets 225-1, 225-2, 225-3, and 225-4 to logic chiplet 220. Logic chiplet 220 can include a command replicator 260 to replicate a command received at dedicated pins 231 and transmit the replicated command among selected memory media chiplets 225-1, 225-2, 225-3, and 225-4. Logic chiplet 220 can include a command manager 270 to execute custom commands to one or more selected memory media chiplets of the multiple memory media chiplets 225-1, 225-2, 225-3, and 225-4. Logic chiplet 220 can include an accelerator 275 to process a command and associated data and interface to one or more selected memory media chiplets of the multiple memory media chiplets 225-1, 225-2, 225-3, and 225-4. The command associated data can be subjected to the interfacing operations using a hybrid protocol in response to at least a portion of the processing.

Arrangement 200 can allow a memory vendor to build modular, scalable systems that can support both deterministic and non-deterministic timed I/O to media and memory sub-systems of media. The operation to the memory sub-systems can be conducted at varied GT/s. RAS development can be performed internal to the memory system that can include the memory sub-systems. Command replication in a logic device of the memory system can be more efficient than packetized solutions such as in CXL Type 3 devices. Arrangement 200 provides for command manager 270 to support custom commands and for accelerator 275 for processing near memory that is effectively tied to accelerator 275. As discussed above, arrangement 200 can support multiple media types.

Examples of various permutations of implementation or partial implementation of a memory-centric protocol with dedicated unidirectional serialized interfaces are shown in FIGS. 3-8. In these figures, the structures can include dedicated interface pins, which can be unallocated depending on the various PROTs implemented in these example arrangements.

Figure 3:
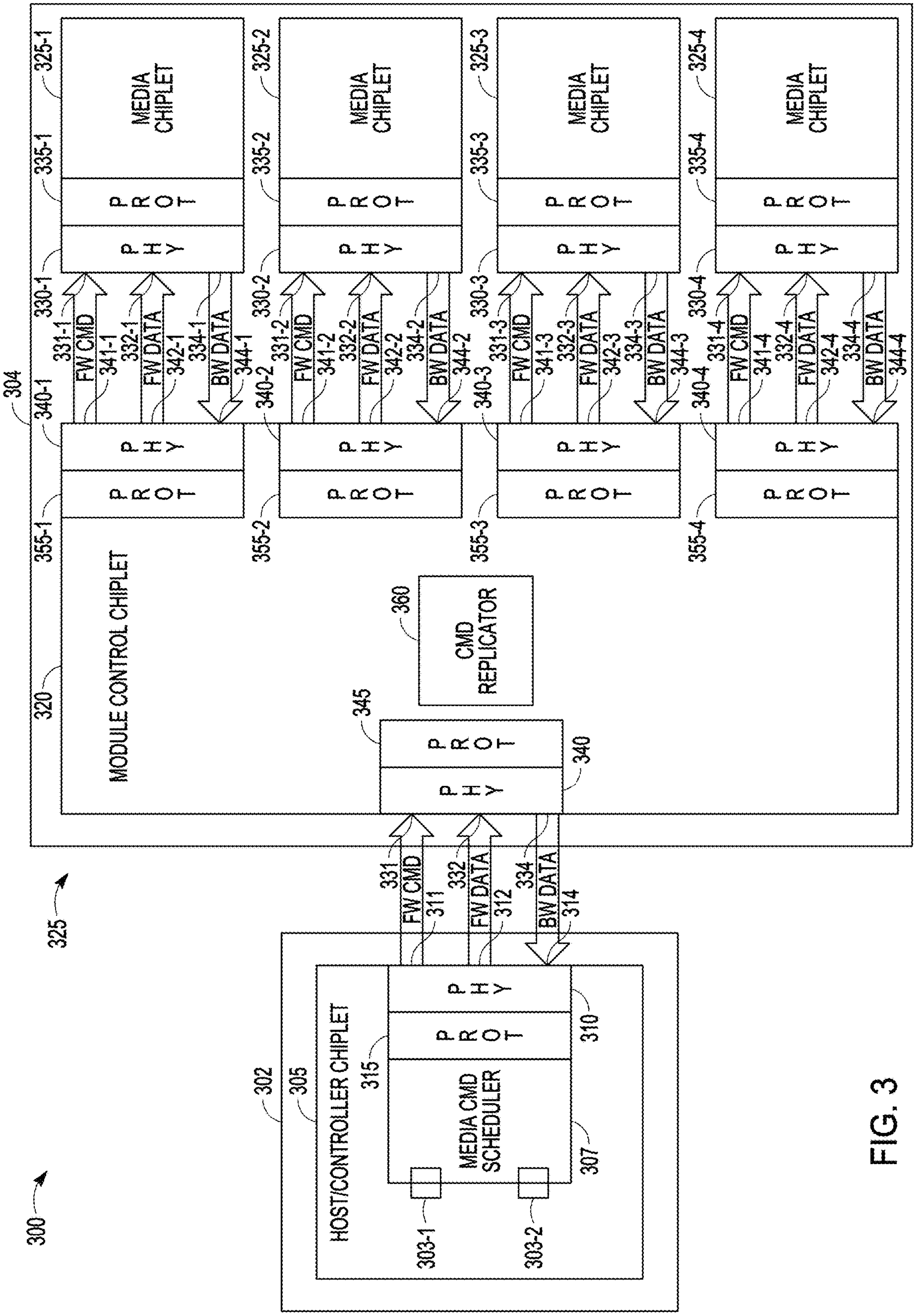
FIG. 3 illustrates an arrangement applicable for a deterministic serialized dual in-line memory module, in accordance with various embodiments.

FIG. 3 illustrates an arrangement 300 applicable for a deterministic serialized DIMM. The DIMM can include media chiplets in lock-step. Arrangement 300 can include a host/controller chiplet 305 interfacing a DIMM 325. In an example operation with four media chiplets, thirty-two channels between host/controller chiplet 305 interfacing DIMM 325 operating at 16 GT/s can include operating at 16 GT/s for eight channels to each of the four media chiplets. Though four media chiplets are shown, arrangement 300 can have more or fewer media chiplets. Host/controller chiplet 305 can be implemented on a package 302 and DIMM 325 can be implemented on a package 304. Package 302 can be different from package 304. Each of the pins discussed below in arrangement 300 can be a set of one or more pins.

DIMM 325 can include a module control chiplet 320 through which command and data flow is conducted. Module control chiplet 320 can include a PROT 345 on top of a PHY 340. A forward command path can be structured between pins 311 of host/controller chiplet 305 and pins 331 of module control chiplet 320 at PHY 340. A forward data path can be structured between pins 312 of host/controller chiplet 305 and pins 332 of module control chiplet 320 at PHY 340. A backward data path can be structured between pins 314 of host/controller chiplet 305 and pins 334 of module control chiplet 320 at PHY 340. PROT 315 and PROT 345 can be structured to operate in deterministic serialized manner. Host/controller chiplet 305 can include a media command scheduler 307 to schedule commands and data flow with DIMM 325. Media command scheduler 307 can include connections 303-1 and 303-2.

DIMM 325 can include module control chiplet 320 coupled to media chiplets 325-1, 325-2, 325-3, and 325-4, where these media chiplets can be configured in the same manner. Media chiplet 325-1 can be coupled to a PROT 335-1 on top of a PHY 330-1 having pins 331-1, 332-1, and 334-1 to interface module control chiplet 320. Pins 331-1 can be structured to receive forward commands from module control chiplet 320. Pins 332-1 can be structured to receive forward data from module control chiplet 320. Pins 334-1 can be structured to transmit backward data from media chiplet 325-1 to module control chiplet 320.

Media chiplet 325-2 can be coupled to a PROT 335-2 on top of a PHY 330-2 having pins 331-2, 332-2, and 334-2 to interface module control chiplet 320. Pins 331-2 can be structured to receive forward commands from module control chiplet 320. Pins 332-2 can be structured to receive forward data from module control chiplet 320. Pins 334-2 can be structured to transmit backward data from media chiplet 325-2 to module control chiplet 320.

Media chiplet 325-3 can be coupled to a PROT 335-3 on top of a PHY 330-3 having pins 331-3, 332-3, and 334-3 to interface module control chiplet 320. Pins 331-3 can be structured to receive forward commands from module control chiplet 320. Pins 332-3 can be structured to receive forward data from module control chiplet 320. Pins 334-3 can be structured to transmit backward data from media chiplet 325-3 to module control chiplet 320.

Media chiplet 325-4 can be coupled to a PROT 335-4 on top of a PHY 330-4 having dedicated pins 331-4, 332-4, and 334-3 to interface module control chiplet 320. Dedicated pins 331-4 can be structured to receive forward commands from module control chiplet 320. Dedicated pins 332-4 can be structured to receive forward data from module control chiplet 320. Dedicated pins 334-4 can be structured to transmit backward data from media chiplet 325-4 to module control chiplet 320.

Media chiplets 325-1, 325-2, 325-3, and 325-4 can be coupled by different channels to module control chiplet 320. Module control chiplet 320 can include a PROT 355-1 on top of PHY 340-1 having pins 341-1, 342-1, and 344-1. A forward command path can be structured to transit forward commands from pins 341-1 to pins 331-1 for media chiplet 325-1. A forward data path can be structured to transit forward data from pins 342-1 to pins 332-1 for media chiplet 325-1. A backward data path can be structured to receive backward data at pins 344-1 from 334-1 for media chiplet 325-1.

Module control chiplet 320 can include a PROT 355-2 on top of PHY 340-2 having pins 341-2, 342-2, and 344-2. A forward command path can be structured to transit forward commands from pins 341-2 to pins 331-2 for media chiplet 325-2. A forward data path can be structured to transit forward data from pins 342-2 to pins 332-2 for media chiplet 325-2. A backward data path can be structured to receive backward data at pins 344-2 from 334-2 for media chiplet 325-2.

Module control chiplet 320 can include a PROT 355-3 on top of PHY 340-3 having pins 341-3, 342-3, and 344-3. A forward command path can be structured to transit forward commands from pins 341-3 to pins 331-3 for media chiplet 325-3. A forward data path can be structured to transit forward data from pins 342-3 to pins 332-3 for media chiplet 325-3. A backward data path can be structured to receive backward data at pins 344-3 from 334-3 for media chiplet 325-3.

Module control chiplet 320 can include a PROT 355-4 on top of PHY 340-4 having pins 341-4, 342-4, and 344-4. A forward command path can be structured to transit forward commands from pins 341-4 to pins 331-4 for media chiplet 325-4. A forward data path can be structured to transit forward data from pins 342-4 to pins 332-4 for media chiplet 325-4. A backward data path can be structured to receive backward data at pins 344-4 from 334-4 for media chiplet 325-4.

Module control chiplet 320 can include a command replicator to replicate commands received on pins 331 at PHY 340, based on operation of media command scheduler 307 of host/controller chiplet 305. Command replicator 360 can dispense the replicated commands among one or more selected media chiplets of media chiplets 325-1, 325-2, 325-3, and 325-4. The protocols for commands and data flow between module control chiplet 320 and media chiplets 325-1, 325-2, 325-3, and 325-4 can be structured to operate in deterministic serialized manner.

PHY 310 and PHY 340 can also have dedicated pins for a backward command path between host/controller chiplet 305 and module control chiplet 320. With PROTs 315 and 345 arranged to operate in a deterministic serialized manner, such dedicated pins can be left unallocated. Likewise, each of PHY 340-1 and PHY 330-1, PHY 340-2 and PHY 330-2, PHY 340-3 and PHY 330-3, and PHY 340-4 and PHY 330-4 can also have dedicated pins for a backward command path between module control chiplet 320 and media chiplets 325-1, 325-2, 325-3, and 325-4, respectively. With PROTs 355-1 and 335-1, PROTs 355-2 and 335-2, PROTs 355-3 and 335-3, and PROTs 355-4 and 335-4 arranged to operate in a deterministic serialized manner, such dedicated pins can be left unallocated.

Figure 4:
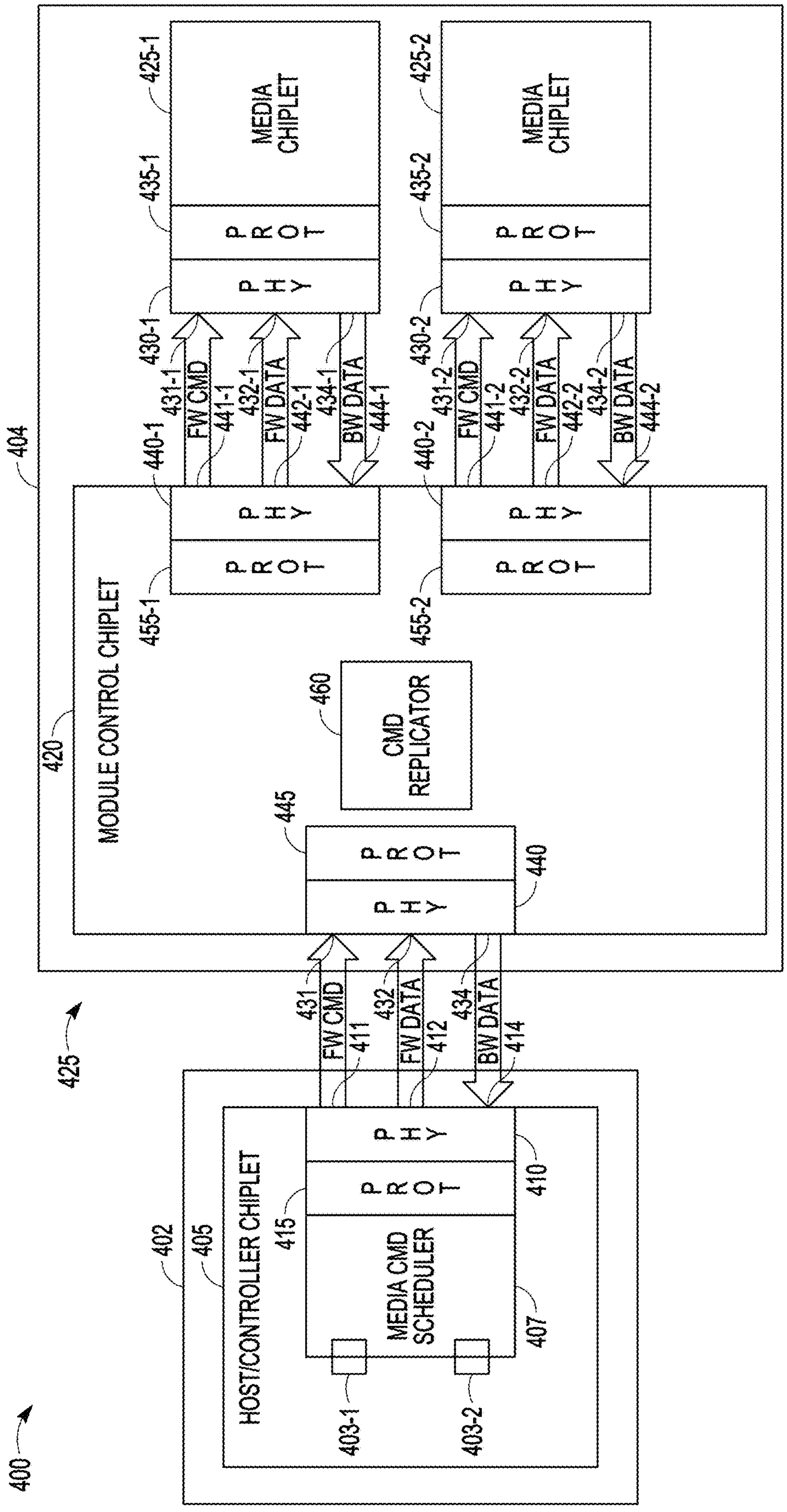
FIG. 4 illustrates an arrangement applicable for a deterministic serialized multi-ranked buffered dual in-line memory module, in accordance with various embodiments.

FIG. 4 illustrates an arrangement 400 applicable for deterministic serialized multi-ranked buffered DIMM (MRDIMM). MRDIMM can be implemented as multi-rank media chiplets of DDR5 memory. Arrangement 400 can include a host/controller chiplet 405 interfacing a MRDIMM 425. In an example operation with media chiplets of rank two, thirty-two channels between host/controller chiplet 405 interfacing MRDIMM 425 operating at 32 GT/s can operate with 16 GT/s for thirty-two channels of each of the two media chiplets. Though two media chiplets of different ranks are shown, arrangement 300 can have more than two media chiplets of different rank. Host/controller chiplet 405 can be implemented on a package 402 and MRDIMM 425 can be implemented on a package 404. Package 402 can be different from package 404. Each of the pins discussed below in arrangement 400 can be a set of one or more pins.

MRDIMM 425 can include a module control chiplet 420 through which command and data flow is conducted. Module control chiplet 420 can include a PROT 445 on top of PHY 440. A forward command path can be structured between pins 411 of host/controller chiplet 405 and pins 431 of module control chiplet 420 at PHY 440. A forward data path can be structured between pins 412 of host/controller chiplet 405 and pins 432 of module control chiplet 420 at PHY 440. A backward data path can be structured between pins 414 of host/controller chiplet 405 and pins 434 of module control chiplet 420 at PHY 440. PROT 415 and PROT 445 can be structured to operate in deterministic serialized manner. Host/controller chiplet 405 can include a media command scheduler 407 to schedule commands and data flow with MRDIMM 425. Media command scheduler 407 can include connections 403-1 and 403-2.

MRDIMM 425 can include module control chiplet 420 coupled to media chiplet 425-1, which can be memory of the first rank, and media chiplet 425-2, which can be memory of the second rank, where these media chiplets can be configured in the same manner. Media chiplet 425-1 can include a PROT 435-1 on top of a PHY 430-1 having pins 431-1, 432-1, and 434-1 to interface module control chiplet 420. Pins 431-1 can be structured to receive forward commands from module control chiplet 420. Pins 432-1 can be structured to receive forward data from module control chiplet 420. Pins 434-1 can be structured to transmit backward data from media chiplet 425-1 to module control chiplet 420.

Media chiplet 425-2 can include a PROT 435-2 on top of a PHY 430-2 having pins 431-2, 432-2, and 434-2 to interface module control chiplet 420. Pins 431-2 can be structured to receive forward commands from module control chiplet 420. Pins 432-2 can be structured to receive forward data from module control chiplet 420. Pins 434-2 can be structured to transmit backward data from media chiplet 425-2 to module control chiplet 420.

Media chiplets 425-1 and 425-2 can be coupled by different channels to module control chiplet 420. Module control chiplet 420 can include a PROT 455-1 on top of PHY 440-1 having pins 441-1, 442-1, and 444-1. A forward command path can be structured to transit forward commands from pins 441-1 to pins 431-1 for media chiplet 425-1. A forward data path can be structured to transit forward data from pins 442-1 to pins 432-1 for media chiplet 425-1. A backward data path can be structured to receive backward data at pins 444-1 from 434-1 for media chiplet 425-1.

Module control chiplet 420 can include a PROT 455-2 on top of PHY 440-2 having pins 441-2, 442-2, and 444-2. A forward command path can be structured to transit forward commands from pins 441-2 to pins 431-2 for media chiplet 425-2. A forward data path can be structured to transit forward data from pins 442-2 to pins 432-2 for media chiplet 425-2. A backward data path can be structured to receive backward data at pins 444-2 from 434-2 for media chiplet 425-2.

Module control chiplet 420 can include a command replicator 460 to replicate commands received on pins 431 at PHY 440, based on operation of media command scheduler 407 of host/controller chiplet 405. Command replicator 460 can dispense the replicated commands among media chiplets 425-1 and 425-2. The protocols for commands and data flow between module control chiplet 420 and media chiplets 425-1 and 425-2 can be structured to operate in deterministic serialized manner.

PHY 410 and PHY 440 can also have dedicated pins for a backward command path between host/controller 405 and module control chiplet 420. With PROTs 415 and 445 arranged to operate in a deterministic serialized manner, such dedicated pins can be left unallocated. Likewise, each of PHY 440-1 and PHY 430-1 and PHY 440-2 and PHY 430-2 can also have dedicated pins for a backward command path between module control chiplet 420 and media chiplets 425-1 and 425-2, respectively. With PROTs 455-1 and 435-1 and PROTs 455-2 and 435-2 arranged to operate in a deterministic serialized manner, such dedicated pins can be left unallocated.

Figure 5:
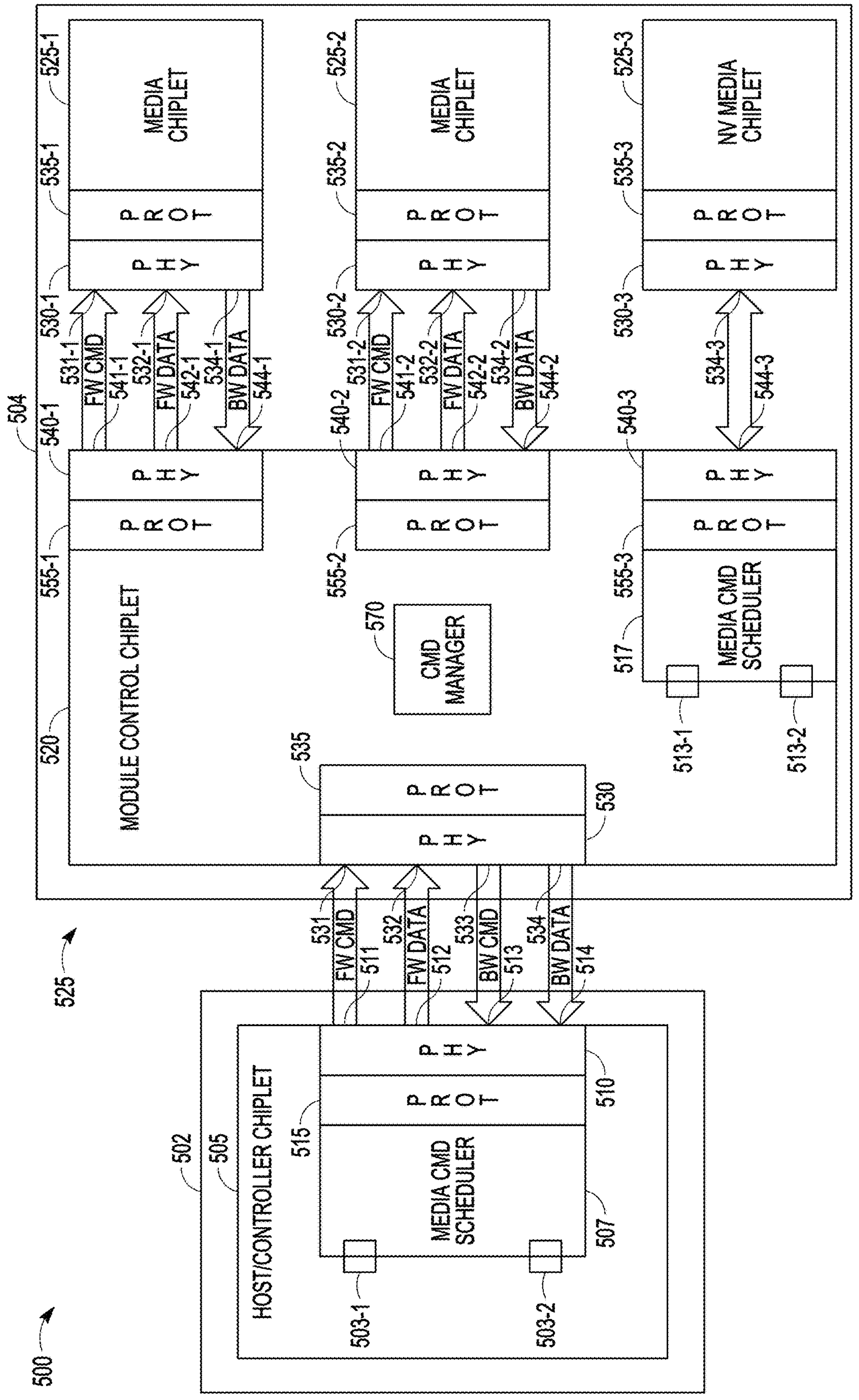
FIG. 5 illustrates an arrangement applicable for a deterministic serialized non-volatile dual in-line memory module type N, in accordance with various embodiments.

FIG. 5 illustrates an arrangement 500 applicable for a deterministic serialized non-volatile DIMM type N (NVDIMM-N). NVDIMM-N is a DIMM with NV storage such as flash storage and volatile storage such as DRAM on the same module. Arrangement 500 can include a host/controller chiplet 505 interfacing a NVDIMM-N 525 including media chiplets 525-1 and 525-2, respectively, along with a NV media chiplet 525-3. In an example operation, sixteen channels between host/controller chiplet 505 interfacing NVDIMM-N 525 operating at 16 GT/s can include operating with 16 GT/s for eight channels of each of the two media chiplets 525-1 and 525-2. Though two media chiplets and one NV media chiplet are shown, arrangement 500 can have different permutations of the number of media chiplets and NV media chiplets. Host/controller chiplet 505 can be implemented on a package 502 and NVDIMM-N 525 can be implemented on a package 504. Package 502 can be different from package 504. Each of the pins discussed below in arrangement 500 can be a set of one or more pins.

NVDIMM-N 525 can include a module control chiplet 520 through which command and data flow is conducted. Module control chiplet 520 can include a PROT 535 on top of PHY 530. A forward command path can be structured between pins 511 of host/controller chiplet 505 and pins 531 of module control chiplet 520 at PHY 530. A forward data path can be structured between pins 512 of host/controller chiplet 505 and pins 532 of module control chiplet 520 at PHY 530. A backward command path can be structured between pins 513 of host/controller chiplet 505 and pins 533 of module control chiplet 520 at PHY 530, which can provide a unidirectional backward path to receive command details received from NVDIMM-N 525. The command details can be information generated in response to a transmitted command to NVDIMM-N 525 on the unidirectional forward path. A backward data path can be structured between dedicated pins 514 of host/controller chiplet 505 and pins 534 of module control chiplet 520 at PHY 530. Protocol layer 515 and PROT 535 can be structured to operate in a deterministic serialized manner. Pins 511, 512, 513, and 514 of host/controller chiplet 505 and pins 531, 532, 533, and 534 of NVDIMM-N 525 can be structured similar to corresponding pins on arrangement 200 of FIG. 2. Host/controller chiplet 505 can include a media command scheduler 707 to schedule commands and data flow with NVDIMM-N 525. Media command scheduler 507 can include connections 503-1 and 503-2.

NVDIMM-N 525 can include a module control chiplet 520 coupled to media chiplet 525-1 and media chiplet 525-2. In some instances, these media chiplets can be configured in the same manner. Media chiplet 525-1 can be coupled to a PROT 535-1 on top of a PHY 530-1 having pins 531-1, 532-1, and 534-1 to interface module control chiplet 520. Pins 531-1 can be structured to receive forward commands from module control chiplet 520. Pins 532-1 can be structured to receive forward data from module control chiplet 520. Pins 534-1 can be structured to transmit backward data from media chiplet 525-1 to module control chiplet 520.

Media chiplet 525-2 can be coupled to a PROT 535-2 on top of a PHY 530-2 having pins 531-2, 532-2, and 534-2 to interface module control chiplet 520. Pins 531-2 can be structured to receive forward commands from module control chiplet 520. Pins 532-2 can be structured to receive forward data from module control chiplet 520. Pins 534-2 can be structured to transmit backward data from media chiplet 525-2 to module control chiplet 520.

NV media chiplet 525-3 can be coupled to a PROT 535-3 on top of a PHY 530-3 having an interface connector 534-3 to interface module control chiplet 520. Interface connector 534-3 can be structured to receive forward commands and forward data from module control chiplet 520 and to transmit backward data and optionally command details to interface connector 544-3 of module control chiplet 520. Interface connectors 534-3 and 544-3 can be hybrid interfaces that can include permutations of deterministic timing or non-deterministic timing.

Media chiplets 525-1 and 525-2 can be coupled by different channels to module control chiplet 520. Module control chiplet 520 can include a PROT 555-1 on top of PHY 540-1 having pins 541-1, 542-1, and 544-1. A forward command path can be structured to transit forward commands from pins 541-1 to pins 531-1 for media chiplet 525-1. A forward data path can be structured to transit forward data from pins 542-1 to pins 532-1 for media chiplet 525-1. A backward data path can be structured to receive backward data at pins 544-1 from 534-1 for media chiplet 525-1.

Module control chiplet 520 can include a PROT 555-2 on top of PHY 540-2 having pins 541-2, 542-2, and 544-2. A forward command path can be structured to transit forward commands from pins 541-2 to pins 531-2 for media chiplet 525-2. A forward data path can be structured to transit forward data from pins 542-2 to pins 532-2 for media chiplet 525-2. A backward data path can be structured to receive backward data at pins 544-2 from 534-2 for media chiplet 525-2.

Module control chiplet 520 can include a media command scheduler 517 coupled to PROT 555-3 to schedule command and data timing for at least portions of media chiplet 525-3 using deterministic timing. Media command scheduler 517 can include connections 513-1 and 513-2. Module control chiplet 520 can include a command manager 570 to execute custom commands selectively among one or more of media chiplet 525-1, media chiplet 525-2, or NV media chiplet 525-3 of NVDIMM-N 525. The protocols for commands and data flow between module control chiplet 520 and media chiplets 525-1 and 525-2 can be structured to operate in deterministic serialized manner.

Each of PHY 540-1 and PHY 530-1 and PHY 540-2 and PHY 530-2 can have dedicated pins for a backward command path between module control chiplet 520 and media chiplets 525-1 and 525-2, respectively. With PROTs 555-1 and 535-1 and PROTs 555-2 and 535-2 arranged to operate in a deterministic serialized manner, such dedicated pins can be left unallocated.

Figure 6:
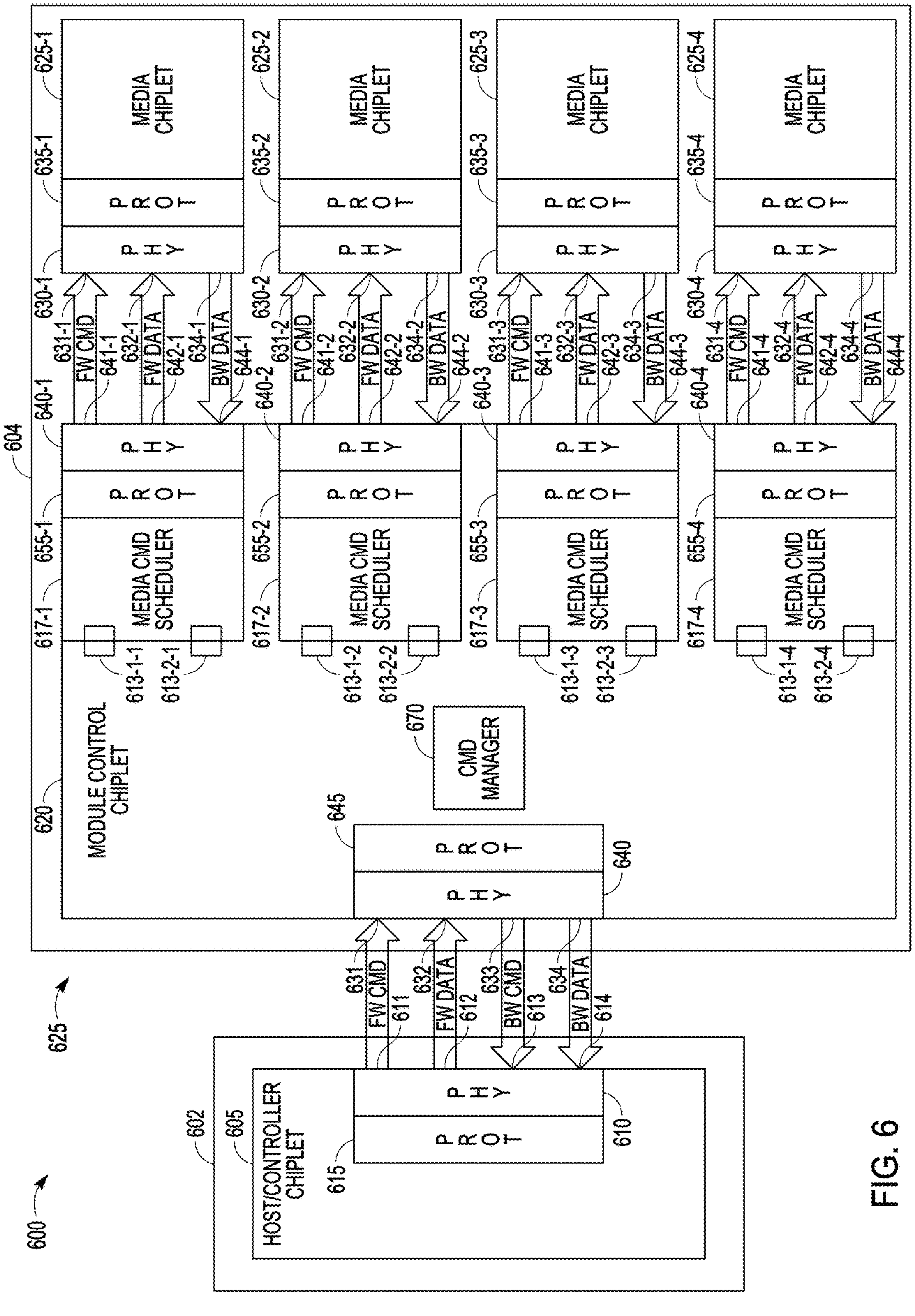
FIG. 6 illustrates an arrangement applicable for a non-deterministic serialized memory module having media chiplets that can include compute express link type 3 devices or compute express link type 3-like devices, in accordance with various embodiments.

FIG. 6 illustrates an arrangement 600 applicable for a non-deterministic serialized memory module having media chiplets 625-1, 625-2, 625-3, and 625-4 that can include CXL type 3 devices or CXL type 3-like devices. The memory module can be a CXL Type 3 memory module (CMM). Such CXL type 3 devices can be used as host-managed device memory, which can have a typical application as a memory expander for the host. The transaction types can include memory read transactions and memory write transactions. Arrangement 600 can include a host/controller chiplet 605 interfacing with a memory module 625 having four media chiplets 625-1, 625-2, 625-3, and 625-4. Though four media chiplets are shown in FIG. 6, an arrangement such as arrangement 600 can have more or fewer than four media chiplets. In an example operation with four media chiplets, sixteen channels between host/controller chiplet 605 and memory module 625 operating at 16 GT/s can include operating at 16 GT/s for eight channels to and from each of the media chiplets. Host/controller chiplet 605 can be implemented on a package 602 and memory module 625 can be implemented on a package 604. Package 602 can be different from package 604. Each of the pins discussed below in arrangement 600 can be a set of one or more pins.

Memory module 625 can include a module control chiplet 620 through which command and data flow is conducted. Module control chiplet 620 can be, but is not limited to, an ASIC chiplet, which can be a logic chiplet or a more complex processing chiplet. Module control chiplet 620 can include a PROT 645 on top of a PHY 640. A forward command path can be structured between pins 611 of host/controller chiplet 605 and pins 631 of control chiplet 620 at PHY 640. A forward data path can be structured between pins 612 of host/controller chiplet 605 and pins 632 of control chiplet 620 at PHY 640. A backward command path can be structured between pins 633 of control chiplet 620 at PHY 640 and pins 613 of host/controller chiplet 605 at PHY 610. Backward command path can provide a unidirectional backward path to provide command details from memory module 625 to host/controller chiplet 605. The command details can be information generated in response to a transmitted command to memory module 625 on the unidirectional forward path between dedicated pins 611 and 631. A backward data path can be structured between pins 614 of host/controller chiplet 605 and pins 634 of control chiplet 620 at PHY 640. Protocol layer 615 and PROT 645 can be structured to operate in a non-deterministic serialized manner between host/controller chiplet 605 and memory module 625.

Memory module 625 can include module control chiplet 620 coupled to media chiplets 625-1, 625-2, 625-3, and 625-4. These media chiplets can be configured in the same manner. Media chiplet 625-1 can be coupled to an interface having a PROT 635-1 on top of a PHY 630-1 having pins 631-1, 632-1, and 634-1 to interface module control chiplet 620. Pins 631-1 can be structured to receive forward commands from module control chiplet 620. Pins 632-1 can be structured to receive forward data from module control chiplet 620. Pins 634-1 can be structured to transmit backward data from media chiplet 625-1 to module control chiplet 620.

Media chiplet 625-2 1 can be coupled to an interface having a PROT 635-2 on top of a PHY 630-2 having pins 631-2, 632-2, and 634-2 to interface module control chiplet 620. Pins 631-2 can be structured to receive forward commands from module control chiplet 620. Pins 632-2 can be structured to receive forward data from module control chiplet 620. Pins 334-2 can be structured to transmit backward data from media chiplet 625-2 to module control chiplet 620.

Media chiplet 625-3 can be coupled to an interface having a PROT 635-3 on top of a PHY 630-3 having pins 631-3, 632-3, and 634-3 to interface module control chiplet 620. Pins 631-3 can be structured to receive forward commands from module control chiplet 620. Pins 632-3 can be structured to receive forward data from module control chiplet 620. Pins 634-3 can be structured to transmit backward data from media chiplet 625-3 to module control chiplet 620.

Media chiplet 625-4 can be coupled to an interface having a PROT 635-4 on top of a PHY 630-4 having pins 631-4, 632-4, and 634-3 to interface module control chiplet 620. Pins 631-4 can be structured to receive forward commands from module control chiplet 620. Pins 632-4 can be structured to receive forward data from module control chiplet 620. Pins 634-4 can be structured to transmit backward data from media chiplet 625-4 to module control chiplet 620.

Media chiplets 625-1, 625-2, 625-3, and 625-4 can have, but are not limited to, different types of PROTs and can be coupled by different channels to module control chiplet 620, where module control chiplet 620 can include PROTs corresponding to the PROTs of the media chiplets. Module control chiplet 620 can include a PROT 655-1 on top of PHY 640-1 having pins 641-1, 642-1, and 644-1. A forward command path can be structured to transit forward commands from pins 641-1 to pins 631-1 for media chiplet 625-1. A forward data path can be structured to transit forward data from pins 642-1 to pins 632-1 for media chiplet 625-1. A backward data path can be structured to receive backward data at pins 644-1 from 634-1 for media chiplet 625-1.

Module control chiplet 620 can include a PROT 655-2 on top of PHY 640-2 having pins 641-2, 642-2, and 644-2. A forward command path can be structured to transit forward commands from pins 641-2 to pins 631-2 for media chiplet 625-2. A forward data path can be structured to transit forward data from pins 642-2 to pins 632-2 for media chiplet 625-2. A backward data path can be structured to receive backward data at pins 644-2 from 634-2 for media chiplet 625-2.

Module control chiplet 620 can include a PROT 655-3 on top of PHY 640-3 having pins 641-3, 642-3, and 644-3. A forward command path can be structured to transit forward commands from pins 641-3 to pins 631-3 for media chiplet 625-3. A forward data path can be structured to transit forward data from pins 642-3 to pins 632-3 for media chiplet 625-3. A backward data path can be structured to receive backward data at pins 644-3 from 634-3 for media chiplet 625-3.

Module control chiplet 620 can include a PROT 655-4 on top of PHY 640-4 having pins 641-4, 642-4, and 644-4. A forward command path can be structured to transit forward commands from pins 641-4 to pins 631-4 for media chiplet 625-4. A forward data path can be structured to transit forward data from pins 642-4 to pins 632-4 for media chiplet 625-4. A backward data path can be structured to receive backward data at pins 644-4 from 634-4 for media chiplet 625-4.

PHY 610 and PHY 640 can have pins for a backward command path between host/controller chiplet 605 and module control chiplet 620. Each of PHY 640-1 and PHY 630-1, PHY 640-2 and PHY 630-2, PHY 640-3 and PHY 630-3, and PHY 640-4 and PHY 630-4 can also have dedicated pins for a backward command path between module control chiplet 620 and memory chiplets 625-1, 625-2, 625-3, or 625-4, respectively, though such pins can be left unallocated.

To manage the command and data flow to memory chiplet 625-1, PROT 655-1 can be implemented in conjunction with a media command scheduler 617-1 having connections 613-1-1 and 613-2-1. To manage the command and data flow to memory chiplet 625-2, PROT 655-2 can be implemented in conjunction with a media command scheduler 617-2 having connections 613-1-2 and 613-2-2. To manage the command and data flow to memory chiplet 625-3, PROT 655-3 can be implemented in conjunction with a media command scheduler 617-3 having connections 613-1-3 and 613-2-3. To manage the command and data flow to memory chiplet 625-4, PROT 655-4 can be implemented in conjunction with a media command scheduler 617-4 having connections 613-1-4 and 613-2-4.

Figure 7:
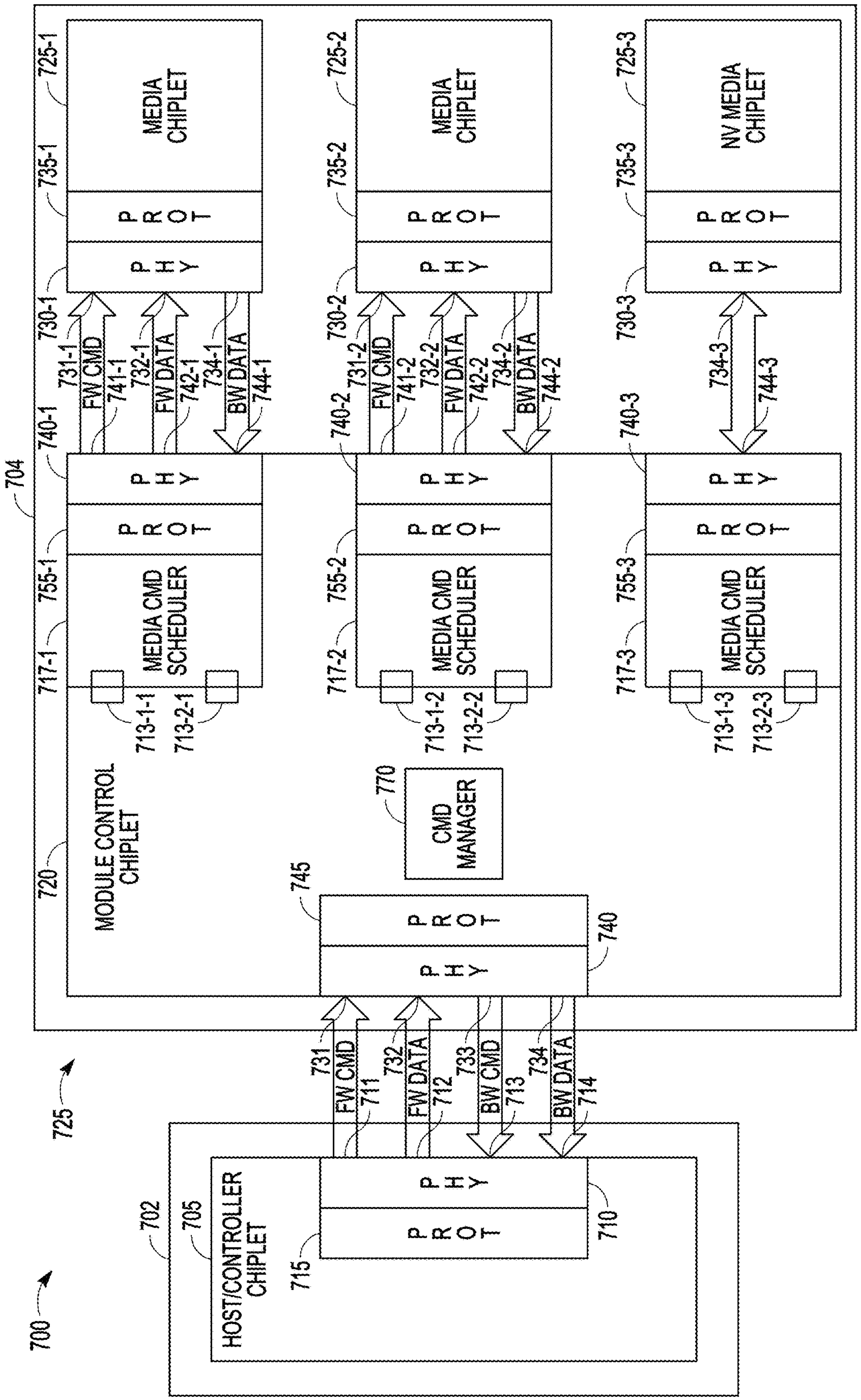
FIG. 7 illustrates an arrangement applicable for a non-deterministic serialized persistent non-volatile dual in-line memory module or similar memory module, in accordance with various embodiments.

FIG. 7 illustrates an arrangement 700 applicable for a non-deterministic serialized NVDIMM-P-like memory module. A NVDIMM-P-like memory module includes at least one NV media chiplet. Arrangement 700 can include a host/controller chiplet 705 interfacing a NVDIMM-P-like memory module 725 having media chiplets 725-1 and 725-2 along with a NV media chiplet 725-3. In an example operation, sixteen channels between host/controller chiplet 505 interfacing NVDIMM-P-like memory module 725 operating at 16 GT/s can include operating with 16 GT/s for eight channels to and from each of the two memory media chiplets 725-1 and 725-2. Though two media chiplets and one NV media chiplet are shown, arrangement 700 can have different permutations of the number of media chiplets and NV media chiplets. Host/controller chiplet 705 can be implemented on a package 702 and NVDIMM-P-like memory module 725 can be implemented on a package 704. Package 702 can be different from package 704. Each of the pins discussed below in arrangement 700 can be a set of one or more pins.

NVDIMM-P-like memory module 725 can include a module control chiplet 720 through which command and data flow is conducted. Module control chiplet 720 can be, but is not limited to, an ASIC chiplet, which can be a logic chiplet or a more complex processing chiplet. Module control chiplet 720 can include a PROT 745 on top of PHY 740 to interface with host/controller chiplet 705. A forward command path can be structured between pins 711 of host/controller chiplet 705 and pins 731 of module control chiplet 720 at PHY 740. A forward data path can be structured between pins 712 of host/controller chiplet 705 and pins 732 of module control chiplet 720 at PHY 740. A backward command path can be structured between pins 713 of host/controller chiplet 705 and pins 733 of module control chiplet 720 at PHY 740, which can provide a unidirectional backward path to receive command details received from NVDIMM-P-like memory module 725. The command details can be information generated in response to a transmitted command to NVDIMM-P-like memory module 725 on the unidirectional forward path. A backward data path can be structured between pins 714 of host/controller chiplet 705 and pins 734 of module control chiplet 720 at PHY 740. Protocol layer 715 and PROT 745 can be structured to operate in a non-deterministic serialized manner, partially based on the backward data path. Pins 711, 712, 713, and 714 of host/controller chiplet 705 and pins 731, 732, 733, and 734 of NVDIMM-P-like memory module 725 can be dedicated pins structured similar to corresponding pins on arrangement 200 of FIG. 2.

NVDIMM-P-like memory module 725 can include module control chiplet 720 coupled to media chiplet 725-1 and media chiplet 725-2. In some instances, these media chiplets can be configured in the same manner. Media chiplet 725-1 can be coupled to a PROT 735-1 on top of a PHY 730-1 having pins 731-1, 732-1, and 734-1 to interface module control chiplet 720. Pins 731-1 can be structured to receive forward commands from module control chiplet 720. Pins 732-1 can be structured to receive forward data from module control chiplet 720. Pins 734-1 can be structured to transmit backward data from media chiplet 725-1 to module control chiplet 720.

Media chiplet 725-2 can be coupled to a PROT 735-2 on top of a PHY 730-2 having pins 731-2, 732-2, and 734-2 to interface module control chiplet 720. Pins 731-2 can be structured to receive forward commands from module control chiplet 720. Pins 732-2 can be structured to receive forward data from module control chiplet 720. Pins 734-2 can be structured to transmit backward data from media chiplet 725-2 to module control chiplet 720.

NV media chiplet 725-3 can be coupled to a PROT 735-3 on top of a PHY 730-3 having an interface connector 734-3 to interface module control chiplet 720. Interface connector 734-3 can be structured to receive forward commands and forward data from module control chiplet 720 and to transmit backward data and optionally command details to interface connector 744-3 of module control chiplet 720. Interface connectors 734-3 and 744-3 can be hybrid interfaces that can include permutations of deterministic timing or non-deterministic timing.

Media chiplets 725-1 and 725-2 can have, but are not limited to, different types of PROTs and can be coupled by different channels to module control chiplet 720, where module control chiplet 720 can include PROTs corresponding to the PROTs of the media chiplets. Module control chiplet 720 can include a PROT 755-1 on top of PHY 740-1 having pins 741-1, 742-1, and 744-1. A forward command path can be structured to transit forward commands from pins 741-1 to pins 731-1 for media chiplet 725-1. A forward data path can be structured to transit forward data from pins 742-1 to pins 732-1 for media chiplet 725-1. A backward data path can be structured to receive backward data at pins 744-1 from 734-1 for media chiplet 725-1.

Module control chiplet 720 can include a PROT 755-2 on top of PHY 740-2 having pins 741-2, 742-2, and 744-2. A forward command path can be structured to transit forward commands from pins 741-2 to pins 731-2 for media chiplet 725-2. A forward data path can be structured to transit forward data from pins 742-2 to pins 732-2 for media chiplet 725-2. A backward data path can be structured to receive backward data at pins 744-2 from 734-2 for media chiplet 725-2.

Each of PHY 740-1 and PHY 730-1 and PHY 740-2 and PHY 730-2 can have dedicated pins for backward command paths between module control chiplet 720 and each of media chiplets 725-1 and 725-2, respectively. Such dedicated pins can be left unallocated such that backward command paths are not used. Without use of backward command paths, module control chiplet 720 can be implemented with a media command scheduler for each interface of module control chiplet 720 to the media chiplets of NVDIMM-P-like memory module 725. Module control chiplet 720 can include a media command scheduler 717-1 coupled to PROT 755-1 to schedule command and data timing for at least portions of media chiplet 725-1. Media command scheduler 717-1 can include connections 713-1-1 and 713-2-1. Module control chiplet 720 can include a media command scheduler 717-2 coupled to PROT 755-2 to schedule command and data timing for at least portions of media chiplet 725-2. Media command scheduler 717-3 can include connections 713-1-2 and 713-2-2. Module control chiplet 720 can include a media command scheduler 717-3 coupled to PROT 755-3 to schedule command and data timing for at least portions of NV media chiplet 725-3. Media command scheduler 717-3 can include connections 713-1-3 and 713-2-3. In addition, module control chiplet 720 can include a command manager 770 to execute custom commands among the various types of media chiplets of NVDIMM-P-like memory module 725. While the interfaces between host/controller chiplet 705 operate in a non-deterministic serialized manner with NVDIMM-P-like memory module 725, the protocols for commands and data flow between module control chiplet 720 and media chiplets 725-1 and 725-2 along with NV media chiplet 725-3 can be structured to operate in a deterministic manner.

Figure 8:
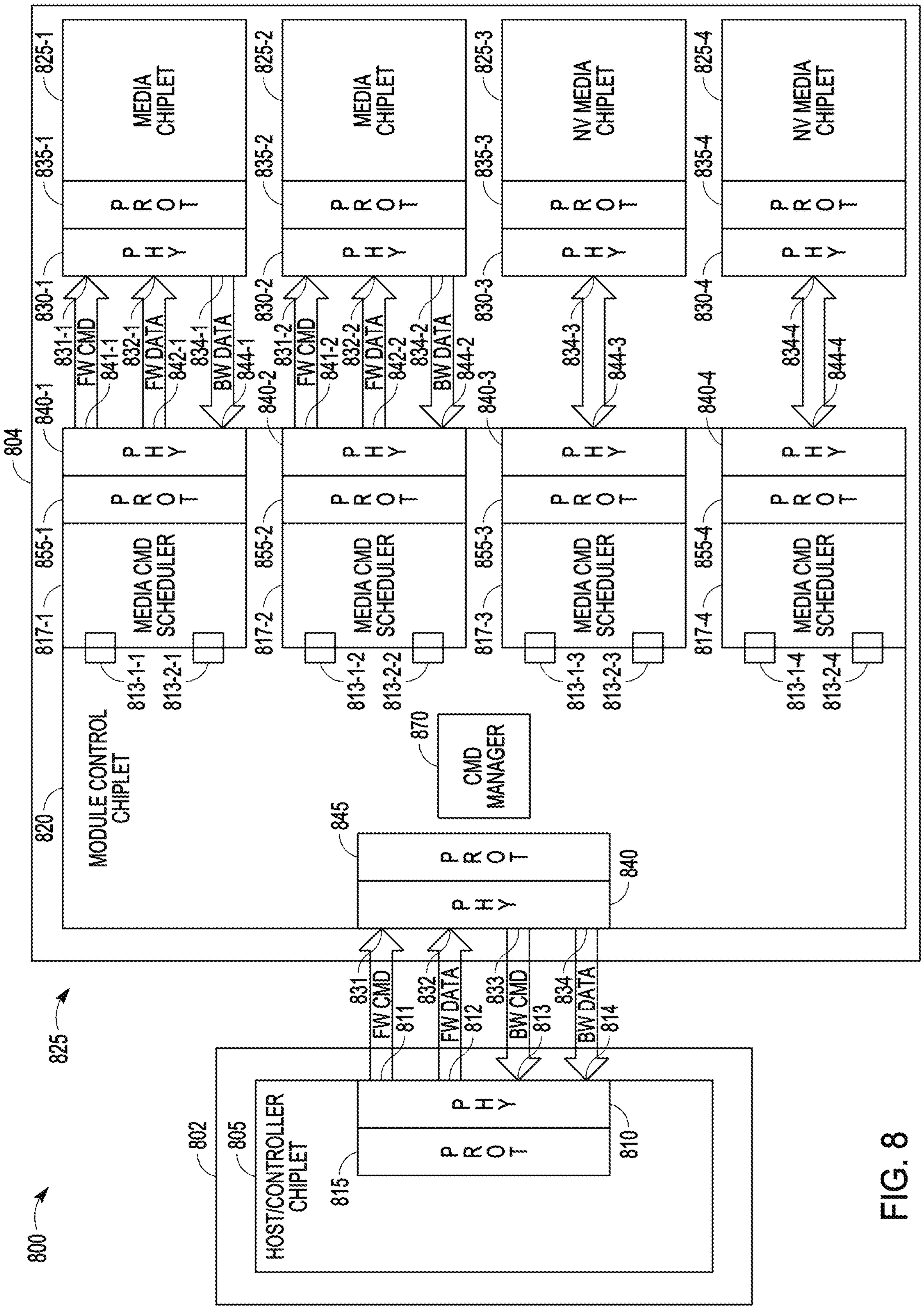
FIG. 8 illustrates an arrangement applicable for a non-deterministic serialized memory module of hybrid media devices, in accordance with various embodiments.

FIG. 8 illustrates an arrangement 800 applicable for a non-deterministic serialized memory module of hybrid media devices. Arrangement 800 can include a host/controller chiplet 805 interfacing a memory module 825 having a media chiplet 825-1, a media chiplet 825-2, a NV media chiplet 825-3, and a NV media chiplet 825-4. In an example operation, sixteen channels between host/controller chiplet 805 interfacing memory module 825 operating at 16 GT/s can include operating with 16 GT/s for eight channels to and from each of the two memory media chiplets 825-1 and 825-2. Though two media chiplets and two NV media chiplets are shown, arrangement 800 can have different permutations of the number of media chiplets and NV media chiplets. Host/controller chiplet 805 can be implemented on a package 802 and memory module 825 can be implemented on a package 804. Package 802 can be different from package 804. Each of the pins discussed below in arrangement 800 can be a set of one or more pins.

Memory module 825 can include a module control chiplet 820 through which command and data flow is conducted. Module control chiplet 820 can be, but is not limited to, an ASIC chiplet, which can be a logic chiplet or a more complex processing chiplet. Module control chiplet 820 can include a PROT 845 on top of PHY 840. A forward command path can be structured between pins 811 of host/controller chiplet 805 and pins 831 of module control chiplet 820 at PHY 840. A forward data path can be structured between pins 812 of host/controller chiplet 805 and pins 832 of module control chiplet 820 at PHY 840. A backward command path can be structured between pins 813 of host/controller chiplet 805 and pins 833 of module control chiplet 820 at PHY 840, which can provide a unidirectional backward path to receive command details received from memory module 825. The command details can be information generated in response to a transmitted command to memory module 825 on the unidirectional forward path. A backward data path can be structured between pins 814 of host/controller chiplet 805 and pins 834 of module control chiplet 820 at PHY 840. Protocol layer 815 and PROT 845 can be structured to operate in a non-deterministic serialized manner. Pins 811, 812, 813, and 814 of host/controller chiplet 805 and pins 831, 832, 833, and 834 of memory module 825 can be dedicated pins structured similar to corresponding pins on arrangement 200 of FIG. 2.

Memory module 825 can include module control chiplet 820 coupled to media chiplet 825-1, memory chiplet 825-2, NV media chiplet 825-3, and media chiplet 825-4. In some instances, groups of media chiplets can be configured in the same manner. Media chiplet 825-1 can be coupled to a PROT 835-1 on top of a PHY 830-1 having pins 831-1, 832-1, and 834-1 to interface module control chiplet 820. Pins 831-1 can be structured to receive forward commands from module control chiplet 820. Pins 832-1 can be structured to receive forward data from module control chiplet 820. Pins 834-1 can be structured to transmit backward data from media chiplet 825-1 to module control chiplet 820.

Media chiplet 825-2 can be coupled to a PROT 835-2 on top of a PHY 830-2 having pins 831-2, 832-2, and 834-2 to interface module control chiplet 820. Pins 831-2 can be structured to receive forward commands from module control chiplet 820. Pins 832-2 can be structured to receive forward data from module control chiplet 820. Pins 834-2 can be structured to transmit backward data from media chiplet 825-2 to module control chiplet 820.

NV media chiplet 825-3 can be coupled to a PROT 835-3 on top of a PHY 830-3 having an interface connector 834-3 to interface module control chiplet 820. Interface connector 834-3 can be structured to receive forward commands and forward data from module control chiplet 820 and to transmit backward data and optionally command details to interface connector 844-3 of module control chiplet 820. Interface connectors 834-3 and 844-3 can be hybrid interfaces that can include permutation of deterministic timing or non-deterministic timing.

Media chiplets 825-1 and 825-2 and NV media chiplets 825-3 and 825-4 can have, but are not limited to, different types of PROTs and can be coupled by different channels to module control chiplet 820, where module control chiplet 820 can include PROTs corresponding to the PROTs of the media chiplets. Control chiplet 820 can include a PROT 855-1 on top of PHY 840-1 having pins 841-1, 842-1, and 844-1. A forward command path can be structured to transit forward commands from pins 841-1 to pins 831-1 for memory chiplet 825-1. A forward data path can be structured to transit forward data from pins 842-1 to pins 832-1 for memory chiplet 825-1. A backward data path can be structured to receive backward data at pins 844-1 from 834-1 for memory chiplet 825-1.

Control chiplet 820 can include a PROT 855-2 on top of PHY 840-2 having pins 841-2, 842-2, and 844-2. A forward command path can be structured to transit forward commands from pins 841-2 to pins 831-2 for memory chiplet 825-2. A forward data path can be structured to transit forward data from pins 842-2 to pins 832-2 for memory chiplet 825-2. A backward data path can be structured to receive backward data at pins 844-2 from 834-2 for memory chiplet 825-2.

Control chiplet 820 can include a PROT 855-3 on top of a PHY 840-3 for communication of commands and data with NV media chiplet 825-3 with appropriate I/O timing. Control chiplet 820 can include a PROT 855-4 on top of a PHY 840-4 for communications of commands and data with NV media chiplet 825-4 with appropriate I/O timing.

Control chiplet 820 can include a media command scheduler 817-1 coupled to PROT 855-1 to schedule command and data timing for at least portions of media chiplet 825-1. Media command scheduler 817-1 can include connections 813-1-1 and 813-2-1. Control chiplet 820 can include a media command scheduler 817-2 coupled to PROT 855-2 to schedule command and data timing for at least portions of media chiplet 825-2. Media command scheduler 817-2 can include connections 813-1-2 and 813-2-2. Control chiplet 820 can include a media command scheduler 817-3 coupled to PROT 855-3 to schedule command and data timing for at least portions of NV media chiplet 825-3. Media command scheduler 817-3 can include connections 813-1-3 and 813-2-3. Control chiplet 820 can include a media command scheduler 817-4 coupled to PROT 855-4 to schedule command and data timing for at least portions of media chiplet 825-4. Media command scheduler 817-4 can include connections 813-1-4 and 813-2-4. Media command schedulers 817-1, 817-2, 817-3, and 817-4 can be implemented to manage deterministic timing. Each of PHY 840-1 and PHY 830-1 and PHY 840-2 and PHY 830-2 can have dedicated pins for a backward command path between module control chiplet 820 and memory chiplets 825-1 and 825-2, respectively. With PROTs 855-1 and 835-1 and PROTs 855-2 and 835-2 arranged to operate in a deterministic serialized manner, such dedicated pins can be left unallocated.

Control chiplet 820 can include a command manager 870 to execute commands among media chiplet 825-1, media chiplet 825-2, NV media chiplets 825-3, and NV media chiplets 825-4. The commands distributed by command manager can be custom commands.

Figure 9:
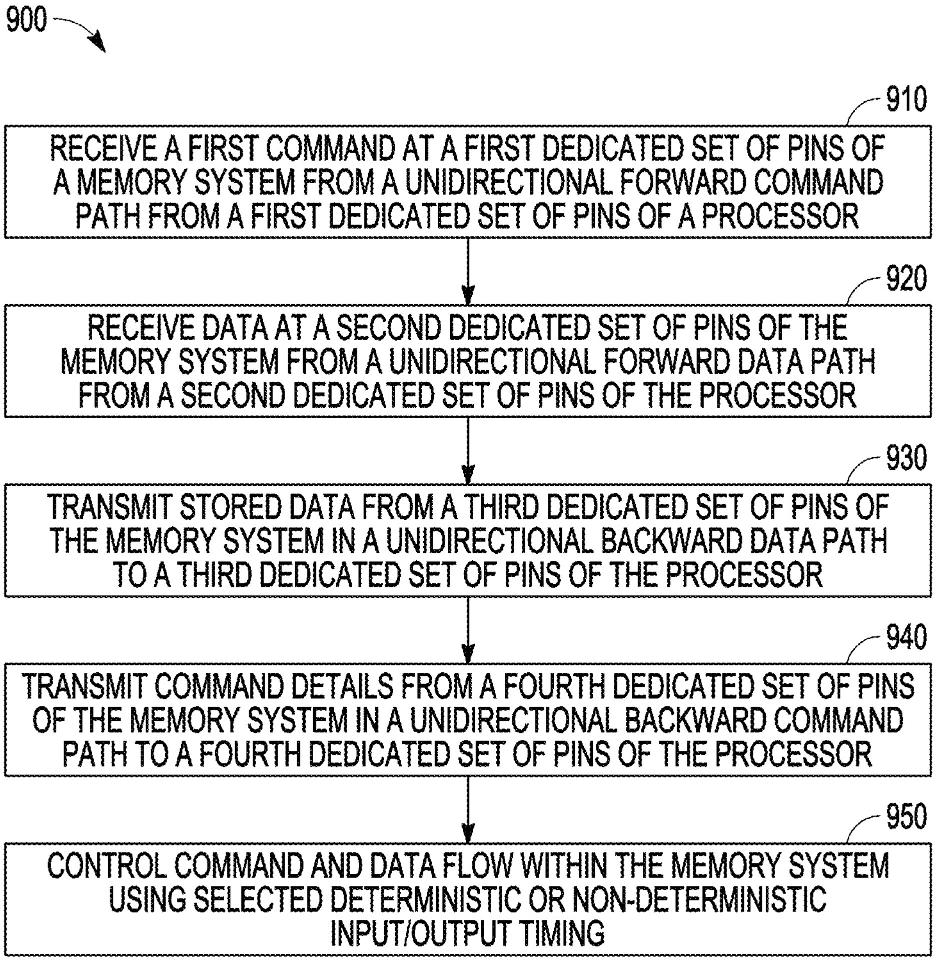
FIG. 9 is a flow diagram of features of an example method of controlling data flows between a memory system and a processor, in accordance with various embodiments.

FIG. 9 is a flow diagram of features of an embodiment of an example method 900 of controlling data flows between a memory system and a processor. At 910, a first command is received at a first dedicated set of pins of a memory system from a unidirectional forward command path from a first dedicated set of pins of a processor. A set of pins is one or more pins. At 920, data is received at a second dedicated set of pins of the memory system from a unidirectional forward data path from a second dedicated set of pins of the processor. The data can correspond to the first command or other appropriate command on the unidirectional forward command path from the first dedicated set of pins of the processor.

At 930, stored data is transmitted from a third dedicated set of pins of the memory system in a unidirectional backward data path to a third dedicated set of pins of the processor. The transmitted stored data is transmitted in response to a command from the processor received at the first dedicated set of pins of the memory system. At 940, command details are transmitted from a fourth dedicated set of pins of the memory system in a unidirectional backward command path to a fourth dedicated set of pins of the processor. The command details can be information corresponding to the stored data transmitted. The command details can include a transaction identification or metadata.

At 950, command and data flow is controlled within the memory system using selected deterministic or non-deterministic I/O timing based on the memory system. Interaction of the memory system with the processor can be controlled with a protocol for dedicated unidirectional serialized interfaces.

Variations of method 900 or methods similar to method 900 can include a number of different embodiments that may be combined depending on the application of such methods and/or the architecture of systems including a memory system for which such methods are implemented. Variations can include operating the memory system with the processor in a point-to-point architecture, with the processor arranged as a host/controller chiplet and the memory system arranged as a memory chiplet having a chiplet interface in which the fourth dedicated set of pins of the memory system is located. The host/controller chiplet can be integrated in a package with the media chiplet.

Variations of method 900 or methods similar to method 900 can include operating the memory system in conjunction with the processor with the memory system having a module control device and one or more memory sub-systems of media chiplets coupled to the module control device. The module control device can be a logic device. The host/controller chiplet and the memory system can be on different packages separated from each other. The module control device can be coupled to an interface containing the first dedicated set of pins of the memory system, the second dedicated set of pins of the memory system, the third dedicated set of pins of the memory system, and the fourth dedicated set of pins of the memory system. Variations can include, with the one or more memory sub-systems being multiple memory sub-systems of media chiplets with at least one memory sub-system of the multiple memory sub-systems being of a media type different from another memory sub-system of the multiple memory sub-systems, controlling data flow to the multiple memory sub-systems using media interfaces of the module control device coupled to the memory sub-systems. Each media interface can include a PROT and a PHY to operate with a memory sub-system of the multiple memory sub-systems according to a memory type of the memory sub-system to which the media interface is coupled. Variations can include each memory sub-system coupled to the module control device in a point-to-point arrangement.

Variations of method 900 or methods similar to method 900 can include replicating a single command received at the first dedicated set of pins and transmitting the replicated command to at least two memory sub-systems. Variations can include executing custom commands to the one or more memory sub-systems using a command manager in the module control device. Variations can include routing, in the module control device, commands among the one or more memory sub-systems. Variations can include processing a command and associated data using an accelerator in the module control device and interfacing a memory sub-system of the one or more memory sub-systems using a hybrid protocol in response to at least a portion of the processing.

The following examples are example embodiments of devices, systems, and methods, in accordance with the teachings herein.

An example processor 1 to control data flow to a memory system can comprise a first dedicated pin of a dedicated forward command path to provide a first unidirectional forward path to transmit commands to the memory system; a second dedicated pin of a dedicated forward data path to provide a second unidirectional forward path to transmit data to the memory system; a third dedicated pin of a dedicated backward command path to provide a first unidirectional backward path to receive command details from the memory system, the command details being information generated in response to a transmitted command to the memory system on the first unidirectional forward path; a fourth dedicated pin of a dedicated backward data path to provide a second unidirectional backward path to receive stored data from the memory system; and a PROT to control interface with the memory system, the memory system operable using selected deterministic or non-deterministic I/O timing within the memory system.

An example processor 2 to control data flow to a memory system can include features of example processor 1 and can include the processor including a host chiplet or a memory controller chiplet.

An example processor 3 to control data flow to a memory system can include features of any of the preceding example processors and can include the processor being integrated in a package with the memory system and the memory system is a media chiplet.

An example processor 4 to control data flow to a memory system can include features of any of the preceding example processors and can include the command details including a transaction identification or metadata.

In an example processor 5 to control data flow to a memory system, any of the processors of example processors 1 to 4 to control data flow to a memory system may include components incorporated into an electronic apparatus further comprising one or more host processors and a communication bus extending between the one or more host processors and the memory system.

In an example processor 6 to control data flow to a memory system, any of the processors of example processors 1 to 5 to control data flow to a memory system may be modified to include any structure presented in another of example processor 1 to 5 to control data flow to a memory system.

In an example processor 7 to control data flow to a memory system, any apparatus associated with the processors of example processors 1 to 6 to control data flow to a memory system may further include a machine-readable storage device configured to store instructions as a physical state, wherein the instructions may be used to perform one or more operations of the apparatus.

In an example processor 8 to control data flow to a memory system, any of the processors of example processors 1 to 7 to control data flow to a memory system may be operated in accordance with any of the below example methods 1 to 17.

An example media chiplet 1 can comprise a first dedicated pin of a dedicated unidirectional forward command path to receive commands from a processor; a second dedicated pin of a dedicated unidirectional forward data path to receive data from the processor; a third dedicated pin of a dedicated unidirectional backward command path to transmit command details to the processor, the command details being information generated in response to a transmitted command to the media chiplet on the first unidirectional forward path; a fourth dedicated pin of a dedicated unidirectional backward data path to transmit stored data to the processor; and a PROT to control command and data flow from the processor based on deterministic or non-deterministic I/O timing characteristics of the media chiplet.

An example media chiplet 2 can include features of example media chiplet 1 and can include the processor including a processor chiplet.

An example media chiplet 3 can include features of any of the preceding example media chiplets 1 to 2 and can include the media chiplet being integrated in a package with the processor.

An example media chiplet 4 can include features of any of the preceding example media chiplets 1 to 3 and can include the media chiplet including stacked media.

An example media chiplet 5 can include features of any of the preceding example media chiplets 1 to 4 and can include command details including a transaction identification or metadata.

In an example media chiplet 6, any of the media chiplets of example media chiplets 1 to 5 may include media chiplets incorporated into an electronic apparatus further comprising a host processor or memory controller and a communication bus extending between the host processor/memory controller and the media chiplet.

In an example media chiplet 7, any of the media chiplets of example media chiplets 1 to 6 may be modified to include any structure presented in another of example media chiplet 1 to 6.

In an example media chiplet 8, any apparatus associated with the media chiplets of example media chiplets 1 to 7 may further include a machine-readable storage device configured to store instructions as a physical state, wherein the instructions may be used to perform one or more operations of the apparatus.

In an example media chiplet 9, any of the media chiplets of example media chiplets 1 to 8 may be operated in accordance with any of the below example methods 1 to 17.

An example memory system 1 can comprise: multiple media chiplets; and a module control device coupled to the multiple media chiplets, the module control device having: a first dedicated pin of a dedicated unidirectional forward command path to receive commands from a processor; a second dedicated pin of a dedicated unidirectional forward data path to receive data from the processor, the data for storage on the memory system; a third dedicated pin of a dedicated unidirectional backward command path to transmit command details to the processor, the command details being information generated in response to a transmitted command to the memory system on the first unidirectional forward path; a fourth dedicated pin of a dedicated unidirectional backward data path to transmit stored data to the processor; and a PROT to control interface with the processor and a PROT to control interface with the multiple media chiplets based on deterministic or non-deterministic input/output timing characteristics of the multiple media chiplets.

An example memory system 2 can include features of example memory system 1 and can include the processor being a host chiplet or a memory controller chiplet and the module control device being coupled to processor via the dedicated unidirectional forward command path, the dedicated unidirectional forward data path, the dedicated unidirectional backward command path, and the dedicated unidirectional backward data path.

An example memory system 3 can include features of any of the preceding example memory systems 1 to 2 and can include the module control device being an application specific integrated circuit logic chiplet.

An example memory system 4 can include features of any of the preceding example memory systems 1 to 3 and can include the module control device including a command router to interleave storage operations across channels coupling the multiple media chiplets to the module control device.

An example memory system 5 can include features of any of the preceding example memory systems 1 to 4 and can include the module control device including a command replicator to replicate a command received at the first dedicated pin and transmit the replicated command to at least two media chiplets of the multiple media chiplets.

An example memory system 6 can include features of any of the preceding example memory systems 1 to 5 and can include the multiple media chiplets including a set of different types of media chiplets, each media chiplet of the set coupled to the module control device by a channel different from channels coupling other media chiplet of the set to the module control device.

An example memory system 7 can include features of example memory system 6 and any of the preceding example memory systems 1 to 6 and can include a first media chiplet of the set including a first media dedicated pin of a dedicated unidirectional forward command path from the module control device to receive commands from the module control device; a second media dedicated pin of a dedicated unidirectional forward data path from the module control device to receive data from the module control device, the data for storage on the first media chiplet; a third media dedicated pin of a dedicated unidirectional backward data path to transmit stored data from the first media chiplet to the module control device; and a PROT to control interface with the module control device based on deterministic or non-deterministic I/O timing characteristics of the first media chiplet.

An example memory system 8 can include features of example memory system 6 and any of the preceding example memory systems 1 to 7 and can include a first media chiplet of the set including: a first media dedicated pin of a dedicated unidirectional forward command path from the module control device to receive commands from the module control device; a second media dedicated pin of a dedicated unidirectional forward data path from the module control device to receive data from the module control device, the data for storage on the first media chiplet; a third media dedicated pin of a dedicated unidirectional backward command path to transmit to transmit command details from the first media chiplet to the module control device; a fourth media dedicated pin of a dedicated unidirectional backward data path to transmit stored data from the first media chiplet to the module control device; and a PROT to control interface with the module control device based on deterministic or non-deterministic I/O timing characteristics of the first media chiplet.

An example memory system 9 can include features of example memory system 6 and any of the preceding example memory systems 1 to 8 and can include a first media chiplet of the set including: a first media dedicated pin of a dedicated unidirectional forward command path from the module control device to receive commands from the module control device; a second media dedicated pin of a bidirectional data path between the module control device and the first media chiplet to write and read data between the module control device and the first media chiplet; and a PROT to control interface with the module control device based on deterministic or non-deterministic I/O timing characteristics of the first media chiplet.

An example memory system 10 can include features of example memory system 6 and any of the preceding example memory systems 1 to 9 and can include a first media chiplet of the set including pins of a hybrid path to the module control device.

An example memory system 11 can include features of example memory system 10 and any of the preceding example memory systems 1 to 9 and can include the module control device including a command manager and an accelerator to control transmission on the hybrid path.

In an example memory system 12, any of the memory systems of example memory systems 1 to 11 may include memory systems incorporated into an electronic apparatus further comprising a host processor and a communication bus extending between the host processor and the memory system.

In an example memory system 13, any of the memory systems of example memory systems 1 to 12 may be modified to include any structure presented in another of example memory system 1 to 12.

In an example memory system 14, any apparatus associated with the memory systems of example memory systems 1 to 13 may further include a machine-readable storage device configured to store instructions as a physical state, wherein the instructions may be used to perform one or more operations of the apparatus.

In an example memory system 15, any of the memory systems of example memory systems 1 to 14 may be operated in accordance with any of the below example methods 1 to 17.

An example method 1 can comprise receiving a first command at a first dedicated set of pins of a memory system from a unidirectional forward command path from a first dedicated set of pins of a processor; receiving data at a second dedicated set of pins of the memory system from a unidirectional forward data path from a second dedicated set of pins of the processor; transmitting stored data from a third dedicated set of pins of the memory system in a unidirectional backward data path to a third dedicated set of pins of the processor; transmitting command details from a fourth dedicated set of pins of the memory system in a unidirectional backward command path to a fourth dedicated set of pins of the processor; and interfacing between the memory system with the processor using selected deterministic or non-deterministic I/O timing based on the memory system.

An example method 2 can include features of example method 1 and can include the command details including information corresponding to the stored data transmitted.

An example method 3 can include features of any of the preceding example methods and can include the command details including a transaction identification or metadata.

An example method 4 can include features of any of the preceding example methods and can include operating the memory system with the processor in a point-to-point architecture, with the processor arranged as a host or controller chiplet and the memory system arranged as a memory chiplet having a chiplet interface in which the fourth dedicated set of pins of the memory system is located.

An example method 5 can include features of example method 4 and any of the preceding example methods and can include the host or controller chiplet integrated in a package with the media chiplet.

An example method 6 can include features of any of the preceding example methods and can include operating the memory system in conjunction with the processor with the memory system having a module control device and one or more memory sub-systems of media chiplets coupled to the module control device, the module control device coupled to an interface containing the first dedicated set of pins of the memory system, the second dedicated set of pins of the memory system, the third dedicated set of pins of the memory system, and the fourth dedicated set of pins of the memory system.

An example method 7 can include features of example method 6 and any of the preceding example methods and can include, with the one or more memory sub-systems being multiple memory sub-systems of media chiplets with at least one memory sub-system of the multiple memory sub-systems being of a media type different from another memory sub-system of the multiple memory sub-systems, controlling data flow to the multiple memory sub-systems using media interfaces of the module control device coupled to the memory sub-systems.

An example method 8 can include features of example method 7 and any of the preceding example methods and can include each media interface including a PROT and a PHY to operate with a memory sub-system of the multiple memory sub-systems according to a memory type of the memory sub-system to which the media interface is coupled.

An example method 9 can include features of example method 6 and any of the preceding example methods and can include each memory sub-system being coupled to the module control device in a point-to-point arrangement.

An example method 10 can include features of example method 6 and any of the preceding example methods and can include replicating a single command received at the first dedicated pin and transmitting the replicated command to at least two memory sub-systems.

An example method 11 can include features of example method 6 and any of the preceding example methods and can include executing custom commands to the one or more memory sub-systems using a command manager in the module control device.

An example method 12 can include features of example method 6 and any of the preceding example methods and can include routing, in the module control device, commands among the one or more memory sub-systems.

An example method 13 can include features of example method 6 and any of the preceding example methods and can include processing a command and associated data using an accelerator in the module control device and interfacing a memory sub-system of the one or more memory sub-systems using a hybrid protocol in response to at least a portion of the processing.

In an example method 14, any of the example methods 1 to 13 may be performed in an electronic apparatus further comprising a host processor and a communication bus extending between the host processor and the memory system.

In an example method 15, any of the example methods 1 to 14 may be modified to include operations set forth in any other of example methods 1 to 14.

In an example method 16, any of the example methods 1 to 15 may be implemented at least in part through use of instructions stored as a physical state in one or more machine-readable storage devices.

An example method 17 can include features of any of the preceding example methods 1 to 16 and can include performing functions associated with any features of example processors 1 to 8, media chiplets 1 to 9, and memory systems 1 to 15.

An example machine-readable storage device storing instructions, that when executed by one or more processors, cause a machine to perform operations, to control data flow to a memory system can comprise instructions to perform functions associated with any features of example processors 1 to 8, media chiplets 1 to 9, and memory systems 1 to 15 or perform methods associated with any features of example methods 1 to 17.

As taught herein, memory-centric protocol with dedicated unidirectional serialized interfaces in the two directions of the interface for memory and memory sub-systems are capable of replacing existing standards and standard proposals. Such replacement can be made by convergence of the standards and proposals with the unidirectional serialized interfaces controlled by memory-centric protocols. The unidirectional serialized interfaces can be realized by dedicated pins on the devices connected by the devices. The memory-centric protocol with dedicated unidirectional serialized interfaces can be implemented for both chiplets-based sub-systems and systems and chips-based sub-systems and systems. The memory-centric protocol with dedicated unidirectional serialized interfaces can support deterministic and non-deterministic I/O timing of the memory or memory sub-systems. PROT on top of a PHY with dedicated pins for unidirectional serialized interfaces for communication of commands and data can provide support for future-looking DDR-based DIMMs, future-looking memory modules, future-looking multiple-rank DIMMs, heterogenous media systems, and emerging memory. For example, supported deterministic timed memory or memory sub-systems and interfaces can include future DDR-based memory devices, future-looking serial I/O multiple-rank DIMMs, UCIe for chiplet memory with deterministic timing, HBM interface, and TCDRAM interface with management, among others. For example, supported non-deterministic timed memory or memory sub-systems and interfaces can include DDR4-T devices, NVDIMM-P like structures, and CMMs.

Although specific embodiments have been illustrated and described herein, it will be appreciated by those of ordinary skill in the art that any arrangement that is calculated to achieve the same purpose can be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A processor to control data flow to a memory system, the processor comprising:
- a first dedicated pin of a dedicated forward command path to provide a first unidirectional forward path to transmit commands to the memory system;
- a second dedicated pin of a dedicated forward data path to provide a second unidirectional forward path to transmit data to the memory system;
- a third dedicated pin of a dedicated backward command path to provide a first unidirectional backward path to receive command details from the memory system, the command details being information generated in response to a transmitted command to the memory system on the first unidirectional forward path;
- a fourth dedicated pin of a dedicated backward data path to provide a second unidirectional backward path to receive stored data from the memory system; and
- a protocol layer to control interface with the memory system, the memory system operable using selected deterministic or non-deterministic input or output timing within the memory system.

2. The processor of claim 1, wherein the processor includes a host chiplet or a memory controller chiplet.

3. The processor of claim 1, wherein the processor is integrated in a package with the memory system and the memory system is a media chiplet.

4. The processor of claim 1, wherein the command details include a transaction identification or metadata.

5. A media chiplet comprising:
- a first dedicated pin of a dedicated unidirectional forward command path to receive commands from a processor;
- a second dedicated pin of a dedicated unidirectional forward data path to receive data from the processor;
- a third dedicated pin of a dedicated unidirectional backward command path to transmit command details to the processor, the command details being information generated in response to a transmitted command to the media chiplet on the first unidirectional forward path;
- a fourth dedicated pin of a dedicated unidirectional backward data path to transmit stored data to the processor; and
- a protocol layer to control command and data flow from the processor based on deterministic or non-deterministic input or output timing characteristics of the media chiplet.

6. The media chiplet of claim 5, wherein the processor includes a processor chiplet.

7. The media chiplet of claim 5, wherein the media chiplet is integrated in a package with the processor.

8. The media chiplet of claim 5, wherein the media chiplet includes stacked media.

9. The media chiplet of claim 5, wherein command details include a transaction identification or metadata.

10. A memory system comprising:
- multiple media chiplets; and
- a module control device coupled to the multiple media chiplets, the module control device having:
  - a first dedicated pin of a dedicated unidirectional forward command path to receive commands from a processor;
  - a second dedicated pin of a dedicated unidirectional forward data path to receive data from the processor, the data for storage on the memory system;
  - a third dedicated pin of a dedicated unidirectional backward command path to transmit command details to the processor, the command details being information generated in response to a transmitted command to the memory system on the first unidirectional forward path;
  - a fourth dedicated pin of a dedicated unidirectional backward data path to transmit stored data to the processor; and
  - a protocol layer to control interface with the processor and a protocol layer to control interface with the multiple media chiplets based on deterministic or non-deterministic input or output timing characteristics of the multiple media chiplets.

11. The memory system of claim 10, wherein the processor is a host chiplet or a memory controller chiplet and the module control device is coupled to the processor via the dedicated unidirectional forward command path, the dedicated unidirectional forward data path, the dedicated unidirectional backward command path, and the dedicated unidirectional backward data path.

12. The memory system of claim 10, wherein the module control device is an application specific integrated circuit logic chiplet.

13. The memory system of claim 10, wherein the module control device includes a command router to interleave storage operations across channels coupling the multiple media chiplets to the module control device.

14. The memory system of claim 10, wherein the module control device includes a command replicator to replicate a command received at the first dedicated pin and transmit the replicated command to at least two media chiplets of the multiple media chiplets.

15. The memory system of claim 10, wherein the multiple media chiplets include a set of different types of media chiplets, each media chiplet of the set coupled to the module control device by a channel different from channels coupling other media chiplet of the set to the module control device.

16. The memory system of claim 15, wherein a first media chiplet of the set includes:
- a first media dedicated pin of a dedicated unidirectional forward command path from the module control device to receive commands from the module control device;
- a second media dedicated pin of a dedicated unidirectional forward data path from the module control device to receive data from the module control device, the data for storage on the first media chiplet;
- a third media dedicated pin of a dedicated unidirectional backward data path to transmit stored data from the first media chiplet to the module control device; and a protocol layer to control interface with the module control device based on deterministic or non-deterministic input or output timing characteristics of the first media chiplet.

17. The memory system of claim 15, wherein a first media chiplet of the set includes:

a first media dedicated pin of a dedicated unidirectional forward command path from the module control device to receive commands from the module control device;

a second media dedicated pin of a dedicated unidirectional forward data path from the module control device to receive data from the module control device, the data for storage on the first media chiplet;

a third media dedicated pin of a dedicated unidirectional backward command path to transmit to transmit command details from the first media chiplet to the module control device;

a fourth media dedicated pin of a dedicated unidirectional backward data path to transmit stored data from the first media chiplet to the module control device; and a protocol layer to control interface with the module control device based on deterministic or non-deterministic input or output timing characteristics of the first media chiplet.

18. The memory system of claim 15, wherein a first media chiplet of the set includes:

a first media dedicated pin of a dedicated unidirectional forward command path from the module control device to receive commands from the module control device;

a second media dedicated pin of a bidirectional data path between the module control device and the first media chiplet to write and read data between the module control device and the first media chiplet; and a protocol layer to control interface with the module control device based on deterministic or non-deterministic input or output timing characteristics of the first media chiplet.

19. The memory system of claim 15, wherein a first media chiplet of the set includes pins of a hybrid path to the module control device.

20. The memory system of claim 19, wherein the module control device includes a command manager and an accelerator to control transmission on the hybrid path.

* * * * *